United States Patent
Pell et al.

(10) Patent No.: US 9,584,594 B2
(45) Date of Patent: Feb. 28, 2017

(54) DYNAMIC PROVISIONING OF PROCESSING RESOURCES IN A VIRTUALIZED COMPUTATIONAL ARCHITECTURE

(71) Applicant: MAXELER TECHNOLOGIES LTD., London (GB)

(72) Inventors: Oliver Pell, London (GB); Peter Sanders, London (GB); Nicolas Norvez, London (GB)

(73) Assignee: MAXELER TECHNOLOGIES LTD., London (GB)

( * ) Notice: Subject to any disclaimer, the term of this patent is extended or adjusted under 35 U.S.C. 154(b) by 144 days.

(21) Appl. No.: 14/251,360

(22) Filed: Apr. 11, 2014

(65) Prior Publication Data
US 2015/0296006 A1 Oct. 15, 2015

(51) Int. Cl.
*G06F 15/173* (2006.01)
*H04L 29/08* (2006.01)
*G06F 9/50* (2006.01)

(52) U.S. Cl.
CPC ........ *H04L 67/1006* (2013.01); *G06F 9/5044* (2013.01); *G06F 9/5077* (2013.01);
(Continued)

(58) Field of Classification Search
CPC ........... G06F 2209/5022; G06F 9/5044; G06F 9/5077; H04L 67/1025; H04L 67/1036; H04L 67/1006
See application file for complete search history.

(56) References Cited

U.S. PATENT DOCUMENTS 7,389,510 B2   6/2008  Forrester
8,452,856 B1   5/2013  Lent et al.
(Continued)

FOREIGN PATENT DOCUMENTS

CN   102650950 A   8/2012
WO   2012049247 A1  4/2012

OTHER PUBLICATIONS

"CCGID 2012: Transparent Accelerator Migration in a Virtualized GPU Environment;" http://www.mcs.anl.gov/~balaji/pubs/2012/ccgrid/ccgrid12.vocl-migration.pdf.
(Continued)

*Primary Examiner* — Mohamed Wasel
(74) *Attorney, Agent, or Firm* — Conley Rose, P.C.

(57) ABSTRACT

A system and method of dynamically provisioning virtualized computational resources in a networked computer architecture includes at least one client device operable to run one or more client applications, at least one server device and a resource controller. Each server device comprises one or more physical processors with local memory. Each server device provides a virtual resource layer through which one or more virtual processing resources can be defined and through which the physical processors of the server device can be assigned to the virtual processing resources. In use, one or more virtual processing resources is assigned to a client application for processing of data processing workloads. The resource controller then monitors the utilization of each virtual processing resource and/or any physical processor assigned to the virtual processing resource. The resource controller can dynamically adjust which, and how many, physical processors are assigned to the virtual processing resource.

29 Claims, 10 Drawing Sheets

(52) U.S. Cl.
CPC ...... *H04L 67/1025* (2013.01); *H04L 67/1036* (2013.01); *G06F 2209/5022* (2013.01)

(56) References Cited

U.S. PATENT DOCUMENTS

| | | | |
|---|---|---|---|
| 8,589,554 B2 | 11/2013 | Kelkar et al. | |
| 2008/0082983 A1* | 4/2008 | Groetzner | G06F 9/5083 |
| | | | 718/105 |
| 2010/0217866 A1 | 8/2010 | Nandagopal et al. | |
| 2012/0204186 A1* | 8/2012 | Davidson, II | G06F 9/5077 |
| | | | 718/104 |
| 2012/0260019 A1 | 10/2012 | Malaiyandisamy et al. | |
| 2013/0036417 A1* | 2/2013 | Chen | G06F 9/5077 |
| | | | 718/1 |
| 2013/0111476 A1* | 5/2013 | Medovich | G06F 9/45533 |
| | | | 718/1 |
| 2014/0053151 A1* | 2/2014 | Heninger | G06F 9/5083 |
| | | | 718/1 |
| 2014/0056141 A1* | 2/2014 | Breternitz, Jr. | H04L 49/10 |
| | | | 370/235 |
| 2014/0098702 A1* | 4/2014 | Fricker | H04L 12/28 |
| | | | 370/254 |

OTHER PUBLICATIONS

"rCUDA: Reducing the Number of GPU-Based Accelerators in High Performance Clusters;" http://gpuscience.com/software/rcuda-reducing-the-number-of-gpu-based-accelerators-in-high-performance-clusters/.

* cited by examiner

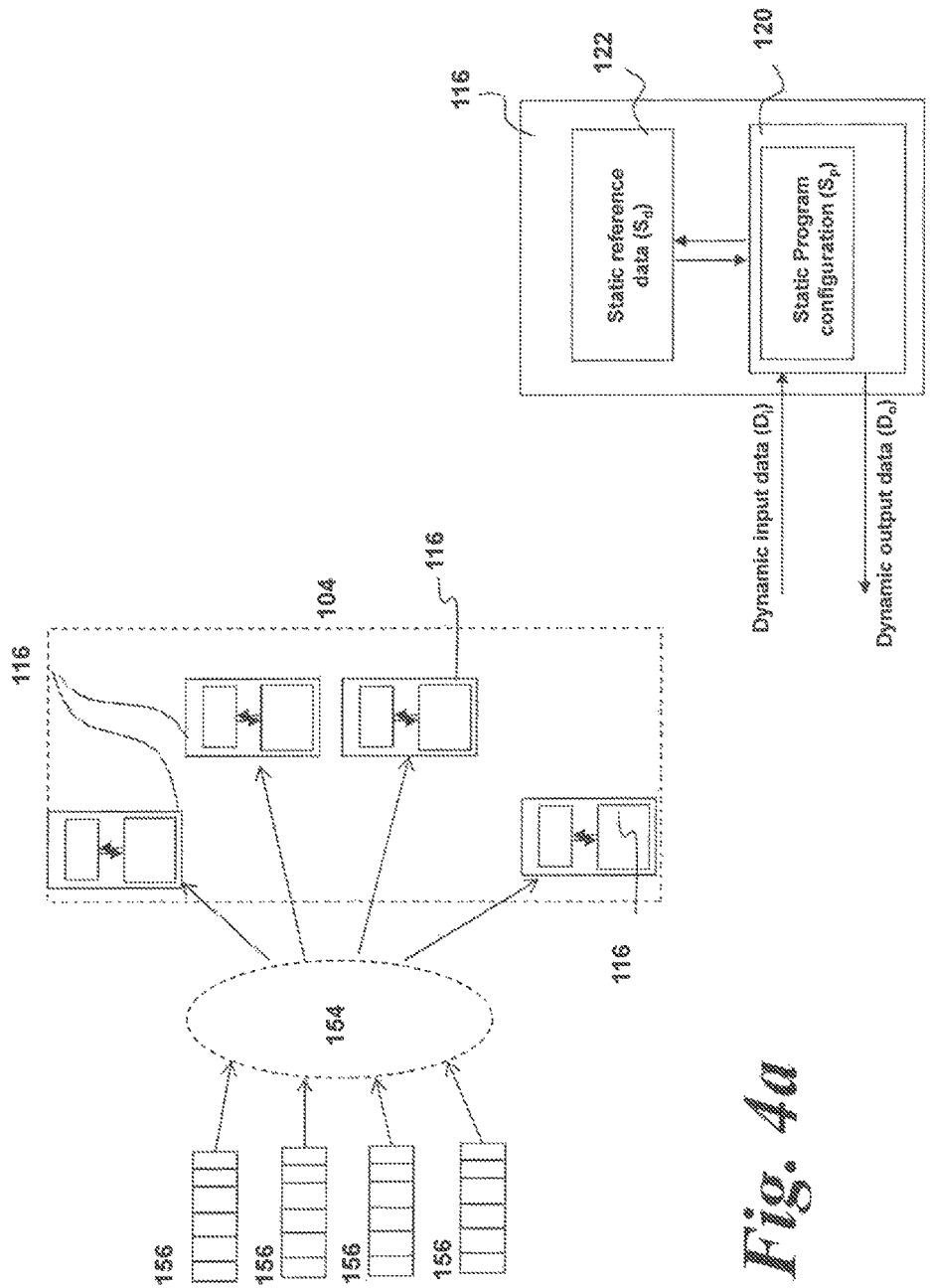

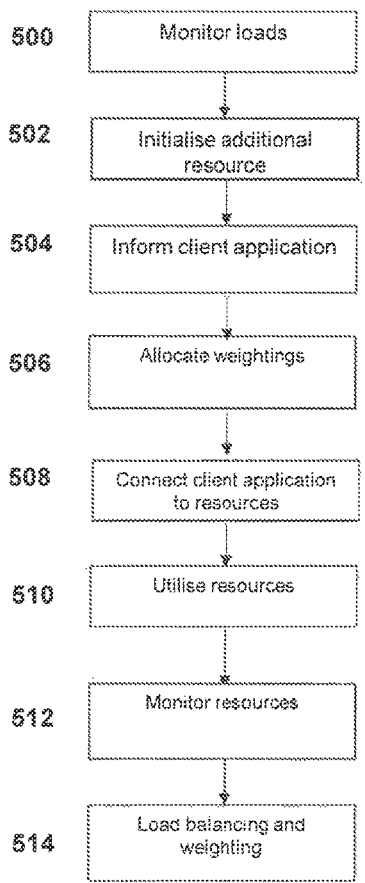
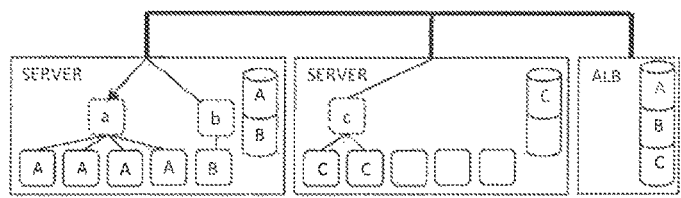
*Fig. 12a*
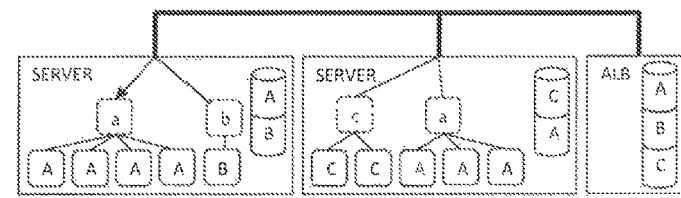
*Fig. 12b*
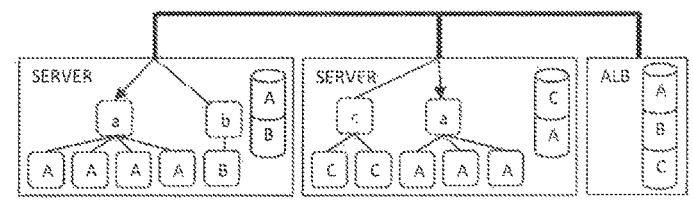
*Fig. 12c*
*Fig. 11*

DYNAMIC PROVISIONING OF PROCESSING RESOURCES IN A VIRTUALIZED COMPUTATIONAL ARCHITECTURE

FIELD OF THE DISCLOSURE

This disclosure relates a method of, and apparatus for, virtualization and management of computing resources. More particularly, this disclosure relates to a method of, and apparatus for, virtualization and management of processing resources in order to optimize the utilization of the processing resources.

BACKGROUND

Computer systems are often used to perform complex numerical calculations. Applications processing such datasets are very time consuming due to the large amount of data that must be processed and complex operations that must be performed.

One approach to increase the speed of a computer system for specialist computing applications is to use additional or specialist hardware accelerators. These hardware accelerators increase the computing power available and concomitantly reduce the time required to perform the calculations.

A suitable system for performing such calculations is a stream processing accelerator having a dedicated local memory. The accelerator may be, for example, located on an add-in card which is connected to the computer via a bus such as Peripheral Component Interconnect Express (PCI-E) or may be connected over a network.

The bulk of the numerical calculations can then be handled by the specialized accelerator. Stream processor accelerators can be implemented using, for example, Field-Programmable Gate Arrays (FPGAs), Application Specific Integrated Circuits (ASICs) and/or structured ASICs. Stream processors implemented as FPGAs generally provide much more computational power than a CPU and so are able to perform calculations more quickly than a CPU. In certain cases, such arrangement may increase the performance of highly parallel applications by over an order of magnitude or more.

It is also possible to scale such an arrangement up to a large number of CPUs working with a large number of stream processors. However, at large scale, it is necessary to manage the workloads between CPUs and the stream processors.

Load balancers are known in network systems. However, traditional load balancing systems sit directly in the path of the work flow from clients to servers. They receive work from clients and distribute them to the most under-utilized system which can handle the request.

This approach adds a significant amount of latency to the computational process. The work has to be received by the load balancer, decoded and handed to an appropriate worker resource.

A traditional load balancer must by necessity perform simple operations, since it must sustain the processing rate of all of the servers, and even so risks becoming a performance bottleneck. If the traditional load balancer wishes to add policies to enforce any relative quality of service for the clients then this adds further latency to the decisions.

A further issue is that, in conventional computing arrangements, each client has a unique and specific data workload. Therefore, computing resources cannot be easily re-provisioned or re-allocated to meet specific client workload demands because the time required to configure additional resources (e.g. by making a point in time copy of all data on the existing resource) is prohibitive.

Therefore, to date, known arrangements for dynamically provisioning resources on a network system are unsuitable for use in high speed computational networks. This disclosure addresses this issue.

SUMMARY

According to a first aspect of this disclosure, there is provided a method of dynamically provisioning virtualized computational resources in a networked computer architecture comprising at least one client device operable to run one or more client applications, at least one server device and a resource controller, each server device comprising one or more physical processors having a local memory, and each server device providing a virtual resource layer through which one or more virtual processing resources can be defined and through which said one or more physical processors of said server device can be assigned to one or more of said virtual processing resources, wherein the method comprises: a) assigning, on a server device, one or more virtual processing resources to one or more client applications for processing of data processing workloads; b) monitoring, by said resource controller, the utilization of the or each virtual processing resource and/or any physical processor assigned to said virtual processing resource; and c) dynamically adjusting, utilizing said resource controller, which, and how many, physical processors are assigned to said virtual processing resource in response to the utilization of said virtual processing resource or the utilization of any physical processors assigned to said virtual processing resource.

In one embodiment, said data processing workload includes input data comprising a static data part and a dynamic data part.

In one embodiment, a copy of the static data part of said data processing workload is stored in the local memory of any physical processor assigned to said virtual processing resource.

In one embodiment, said static data part further comprises program data, and wherein each physical processor assigned to said virtual processing resource is configured using said program data of said static data part.

In one embodiment, said virtual processing resource comprises one or more workload queues.

In one embodiment, a workload queue is assigned to a client application accessing the virtual processing resource.

In one embodiment, the monitoring of the utilization of said virtual processing resource comprises monitoring of the length of the or each workload queue assigned to a virtual processing resource.

In one embodiment, step a) further comprises: d) storing, in said local memory of each physical processor assigned to said virtual processing resource, a copy of said static data part.

In one embodiment, said static data part further comprises program data and step a) further comprises: e) configuring each physical processor assigned to said virtual processing resource using said program data of said static data part.

In one embodiment, one or more further physical processors are added to said virtual processing resource by: f) identifying said further physical processors to add to said virtual processing resource; g) initializing, by said resource controller or said server device, the or each further physical processor by copying, to said local memory of each further physical processor, a copy of said static data set; and h) assigning said one or more further physical processors to said virtual processing resource.

In one embodiment, said static data part further comprises program data and step g) further comprises: i) configuring each physical processor assigned to said virtual processing resource using said program data of said static data part.

In one embodiment, step c) comprises adding one or more further physical processors to said virtual processing resource by: j) identifying said further physical processors to add to said virtual processing resource; k) initializing, utilizing said client device, the or each further physical processor by assigning said one or more further physical processors to said virtual processing resource; and l) copying, to said local memory of each further physical processor, a copy of said static data part.

In one embodiment, said static data part further comprises program data and step k) further comprises: m) configuring each further physical processor assigned to said virtual processing resource using said program data of said static data part.

In one embodiment, step c) comprises migrating said virtual processing resource from said server to an alternative server by: n) identifying alternative physical processors on an alternative server device to add to said virtual processing resource; o) storing, in said local memory of each alternative physical processor, a copy of said static data part; p) assigning said one or more alternative physical processors to a migrated virtual processing resource on said alternative server device; and q) redirecting said client application to said migrated virtual processing resource.

In one embodiment, said static data part further comprises program data and step o) further comprises: r) configuring each further physical processor assigned to said virtual processing resource using said program data of said static data part.

In one embodiment, subsequent to step q):s) de-allocating the or each physical processor on the previously-utilized server.

In one embodiment, prior to step a), the method comprises: t) receiving, at the resource controller, a request from a client application for data processing resources, said request specifying the configuration and/or amount of data processing resources required; and u) allocating, by the resource controller, one or more physical processors on a server device to said request.

In one embodiment, the virtual resource layer comprises an inter-server resource layer and an intra-server resource layer, said one or more virtual processing resources being formed in said intra-server resource layer.

In one embodiment, multiple virtual processing resources can be assigned to a single client application through said inter-server resource layer.

In one embodiment, one or more of said physical processors comprises a stream processor or a collective group of stream processors.

In one embodiment, each of said stream processors are implemented on a Field Programmable Gate Array or an Application Specific Integrated Circuit.

According to a second aspect of this disclosure, there is provided a networked computational architecture for provisioning of virtualized computational resources, the networked computational architecture being accessible by one or more client applications run on one or more client devices and comprising: a hardware layer comprising one or more server devices, each server device having at least one physical processor having a local memory; a virtual resource layer through which one or more virtual processing resources can be defined and through which said one or more physical processors of said server device can be assigned to one or more of said virtual processing resources, the or each virtual processing resource being accessible by the client applications for computational processing of a data processing workload; and a resource controller operable to monitor the utilization of the or each virtual processing resource and/or the or each physical processor assigned to said virtual processing resource and to adjust dynamically which, and how many, physical processors are assigned to the or each virtual processing resource.

In one embodiment, said data processing workload includes input data comprising a static data part and a dynamic data part.

In one embodiment, a copy of the static data part of said data processing workload is stored in the local memory of each physical processor assigned to a given virtual processing resource.

In one embodiment, said static data part further comprises program data, and wherein each physical processor assigned to a given virtual processing resource is configured using said program data of said static data part.

In one embodiment, the resource controller is further configured to add one or more further physical processors to a given virtual processing resource by: identifying said further physical processors to add to said virtual processing resource; initializing, utilizing said resource controller, the or each further physical processor by copying, to said local memory of each further physical processor, a copy of said static data set; and assigning said one or more further physical processors to said virtual processing resource.

In one embodiment, said static data part further comprises program data and the resource controller is further configured to configure each physical processor assigned to a given virtual processing resource using said program data of said static data part.

In one embodiment, the resource controller is further configured to migrate a given virtual processing resource from said server to an alternative server by: identifying alternative physical processors on an alternative server device to add to said virtual processing resource; storing, in said local memory of each alternative physical processor, a copy of said static data set; assigning said one or more alternative physical processors to a migrated virtual processing resource on said alternative server device; and redirecting said client application to said migrated virtual processing resource.

In one embodiment, one or more of said physical processors comprises a stream processor or a collective group of stream processors.

In one embodiment, each of said stream processors are implemented on a Field Programmable Gate Array or an Application Specific Integrated Circuit.

According to a third aspect of this disclosure, there is provided a non-transitory computer-readable medium having stored thereon a computer program executable by a programmable processing apparatus, comprising one or more software portions for performing the steps of the embodiments described.

In embodiments, there is provided a method of managing utilization of computational resources in a networked computer architecture comprising at least one client device, at least one server device and a resource controller, each client device comprising at least one physical processor and being operable to run one or more client applications, and each server device comprising at least one physical processor having a local memory, wherein the method comprises: allocating, by said resource controller, a plurality of server devices to a client application for data processing; assigning, by said resource controller, control information to said client application, said control information specifying the required allocation of a data processing workload to each of the server devices allocated to said client application; and sending, directly from said client application to said servers, said data processing workload, wherein the data processing workload is sent to each server in accordance with said control information.

In one embodiment, said control information comprises a weighting for each server device, the weighting determining the allocation of said data processing workload to each of the server devices allocated to said client application.

In one embodiment, the weighting defines the proportion of a data processing workload that is to be assigned to each of the server devices.

In one embodiment, subsequent to the allocation of server devices the method comprises: monitoring, by said resource controller, the relative utilization of each server device allocated to said client application; and, if said relative utilization is imbalanced: assigning updated control information to said client application.

In one embodiment, prior to step a), the method comprises: receiving, at the resource controller, a request from a client application for data processing resources, said request specifying the configuration and/or amount of data processing resources required.

In one embodiment, a virtual resource layer is provided through which one or more physical processors of said server devices can be allocated to form one or more virtual processing resources.

In one embodiment, the virtual resource layer comprises an intra-server virtual resource layer and an inter-server virtual resource layer, wherein one or more physical processors of each server device can be allocated through said intra-server virtual resource layer to form one or more server device-specific virtual processing resources, and wherein said inter-server virtual resource layer is operable to enable said virtual processing resources to be accessible by one or more client applications.

In one embodiment, the method further comprises, subsequent to the assignment of control information to clients: monitoring, by said resource controller, the relative utilization of each virtual resource and/or; and, if said relative utilization is imbalanced: assigning updated control information to said client application.

In one embodiment, said monitoring further comprises monitoring at least one FIFO queue of said virtual processing resource.

In embodiments, there is provided a networked computational architecture for provisioning of virtualized computational resources, the networked computational architecture being accessible by one or more client applications run on one or more client devices and comprising: a hardware layer comprising a plurality of server devices, each server device having at least one physical processor having a local memory; a resource controller operable to allocate a plurality of server devices to a client application for data processing, to assign control information to said client application, said control information specifying the required allocation of a data processing workload to each of the server devices allocated to said client application, wherein the networked computational architecture is configured such that said client applications are operable to send said data processing workload directly to each server in accordance with said control information.

In one embodiment, said control information comprises a weighting for each server device, the weighting determining the allocation of said data processing workload to each of the server devices allocated to said client application.

In one embodiment, the weighting defines the proportion of a data processing workload that is to be assigned to each of the server devices.

In one embodiment, the resource controller is further operable to monitor the relative utilization of each server device allocated to said client application; and, if said relative utilization is imbalanced, assign updated control information to said client application.

In one embodiment, the architecture further comprises a virtual resource layer through which one or more virtual processing resources can be defined and through which said one or more physical processors of said server device can be assigned to one or more of said virtual processing resources, the or each virtual processing resource being accessible by the client applications for computational processing of a data processing workload.

In one embodiment, the virtual resource layer comprises an intra-server virtual resource layer and an inter-server virtual resource layer, wherein one or more physical processors of each server device can be allocated through said intra-server virtual resource layer to form one or more server device-specific virtual processing resources, and wherein said inter-server virtual resource layer is operable to enable said virtual processing resources to be accessible by one or more client applications.

In one embodiment, said resource controller is operable to monitor the relative utilization of each virtual resource and, if said relative utilization is imbalanced: assign updated control information to said client application.

In one embodiment, the resource controller is operable to monitor at least one FIFO queue of said virtual processing resource.

According to a sixth aspect of this disclosure, there is provided a non-transitory computer-readable medium having stored thereon a computer program executable by a programmable processing apparatus, comprising one or more software portions for performing the steps of the fourth aspect.

In embodiments, there is provided a method of provisioning virtualized computational resources in a networked computer architecture comprising at least one client device operable to run one or more client applications, at least one server device and a resource controller, each server device comprising one or more physical processors having a local memory, and each server device providing a virtual resource layer through which one or more virtual processing resources can be defined and through which said one or more physical processors of said server device can be assigned to one or more of said virtual processing resources, said physical processors being operable to process at least a part of a data processing workload from said one or more client applications, each data processing workload including input data comprising a static data part and a dynamic data part, wherein the method comprises: a) assigning, by said resource controller, a virtual processing resource to a plurality of client applications, wherein the input data for the data processing workload of each of said client applications comprises the same static data part; b) assigning, if required, one or more physical processors to said virtual processing resource; c) storing, in the local memory of any physical processors assigned to said virtual processing resource, the common static data part of said input data; d) allocating a workload queue to each of said plurality of clients to which said virtual processing resource is assigned; and e) sending, from each client application to a respective workload queue, the dynamic parts of said respective data processing workloads; f) processing, on said virtual resource, said data processing workloads.

In one embodiment, prior to step a) the method comprises: g) receiving, at the resource controller, requests from multiple client applications for data processing resources, each request specifying the configuration and/or amount of data processing resources required; and h) identifying one or more client applications sharing a common static part.

In one embodiment, step h) is performed either by the resource controller or by the client.

In one embodiment, said workload queues are accessible by said virtual processing resource in parallel.

In one embodiment, said workload queues are aggregated into a single aggregated workload queue accessible by said virtual processing resource.

In one embodiment, said workload queues are processed in step f) by said virtual processing resource in accordance with a predefined parameter selected from the group of: round robin or longest queue first.

In one embodiment, at least some of said client applications are assigned a priority and said workload queues are processed in step f) by said virtual processing resource in accordance with said priority.

In one embodiment, the method further comprises: i) monitoring, by said resource controller, the utilization of said virtual processing resource and/or any physical processor assigned to said virtual processing resource; and j) dynamically adjusting, utilizing said resource controller, which, and how many, physical processors are assigned to said virtual processing resource in response to the utilization of said virtual processing resource or the utilization of any physical processors assigned to said virtual processing resource.

In one embodiment, step j) comprises adding one or more further physical processors to said virtual processing resource by: k) identifying said further physical processors to add to said virtual processing resource; l) initializing, by said resource controller or said server device, the or each further physical processor by copying, to said local memory of each further physical processor, a copy of said static data set; and m) assigning said one or more further physical processors to said virtual processing resource.

In one embodiment, said static data part further comprises program data and step l) further comprises: n) configuring each physical processor assigned to said virtual processing resource using said program data of said static data part.

In one embodiment, step j) comprises adding one or more further physical processors to said virtual processing resource by: o) identifying said further physical processors to add to said virtual processing resource; p) initializing, utilizing said client device, the or each further physical processor by assigning said one or more further physical processors to said virtual processing resource; and q) copying, to said local memory of each further physical processor, a copy of said static data set.

In one embodiment, said static data part further comprises program data and step l) further comprises: r) configuring each further physical processor assigned to said virtual processing resource using said program data of said static data part.

In one embodiment, the method further comprises the steps of: s) receiving, at the resource controller, a request from a further client application for data processing resources, said request specifying the configuration and/or amount of data processing resources required; and t) identifying whether said client application shares said common static part and, if step t) is positive: u) allocating a workload queue to said client application; and v) sending, from said client application to said workload queue, the dynamic part of the respective data processing workload from said client application; and w) processing, on said virtual resource, said data processing workload.

In one embodiment, the method further comprises the steps of: x) disconnecting a client application from said virtual processing resource; y) releasing the workload queue previously allocated to said workload queue; and z) de-allocating any physical processors assigned specifically to said client application.

In one embodiment, zero physical processors are assigned in step b).

In one embodiment, said one or more physical processors comprise stream processors.

In one embodiment, each of said stream processors are implemented on a Field Programmable Gate Array or an Application Specific Integrated Circuit.

In embodiments, there is provided a networked computational architecture for provisioning of virtualized computational resources, the networked computational architecture being accessible by one or more client applications run on one or more client devices and comprising: a hardware layer comprising one or more server devices, each server device having at least one physical processor having a local memory; a virtual resource layer through which one or more virtual processing resources can be defined and through which said one or more physical processors of said server device can be assigned to one or more of said virtual processing resources, the or each virtual processing resource being accessible by the client applications for computational processing of a data processing workload including input data comprising a static data part and a dynamic data part, said physical processors being operable, if so assigned, to process at least a part of a data processing workload from said one or more client applications, each data processing workload including input data comprising a static data part and a dynamic data part; and a resource controller operable: to assign a virtual processing resource to a plurality of client applications, wherein the input data for the data processing workload of each of said client applications comprises the same static data part; to assign, if required, one or more physical processors to said virtual processing resource; to store, in the local memory of any physical processors assigned to said virtual processing resource, the common static data part of said input data; to allocate a workload queue to each of said plurality of clients to which said virtual processing resource is assigned, the workload queues being operable to receive the respective dynamic parts of said respective data processing workloads.

In one embodiment, said resource controller is further operable to receive requests from multiple client applications for data processing resources, each request specifying the configuration and/or amount of data processing resources required.

In one embodiment, the or each client application, or the resource controller, is operable to identify one or more client applications sharing a common static part.

In one embodiment, said workload queues are accessible by said virtual processing resource in parallel.

In one embodiment, said workload queues are aggregated into a single aggregated workload queue accessible by said virtual processing resource.

In one embodiment, said workload queues are processed by said virtual processing resource in accordance with a predefined parameter selected from the group of: round robin or longest queue first.

In one embodiment, at least some of said client applications are assigned a priority and said workload queues are processed by said virtual processing resource in accordance with said priority.

In one embodiment, the resource controller is further operable to monitor the utilization of said virtual processing resource and/or any physical processor assigned to said virtual processing resource; and to adjust dynamically which, and how many, physical processors are assigned to said virtual processing resource in response to the utilization of said virtual processing resource or the utilization of any physical processors assigned to said virtual processing resource.

In one embodiment, said one or more physical processors comprise stream processors.

In one embodiment, each of said stream processors are implemented on a Field Programmable Gate Array or an Application Specific Integrated Circuit.

In embodiments, there is provided a computer-readable medium having stored thereon a computer program executable by a programmable processing apparatus, comprising one or more software portions for performing the steps of the seventh aspect.

BRIEF DESCRIPTION OF THE DRAWINGS

Exemplary embodiments of this disclosure will now be described in detail with reference to the accompanying drawings, in which:

FIG. 4a shows a schematic diagram similar to FIG. 4 but showing a single server node and virtual resource in more detail;

FIG. 4b shows a schematic diagram of a DFE showing the partitioning of the data into dynamic and static parts;

FIG. 11 is a flow chart showing a method of operation according to a fourth exemplary embodiment of this disclosure;

FIGS. 12a to 12c show an example of resource allocation between server nodes;

DETAILED DESCRIPTION

Figure 1:
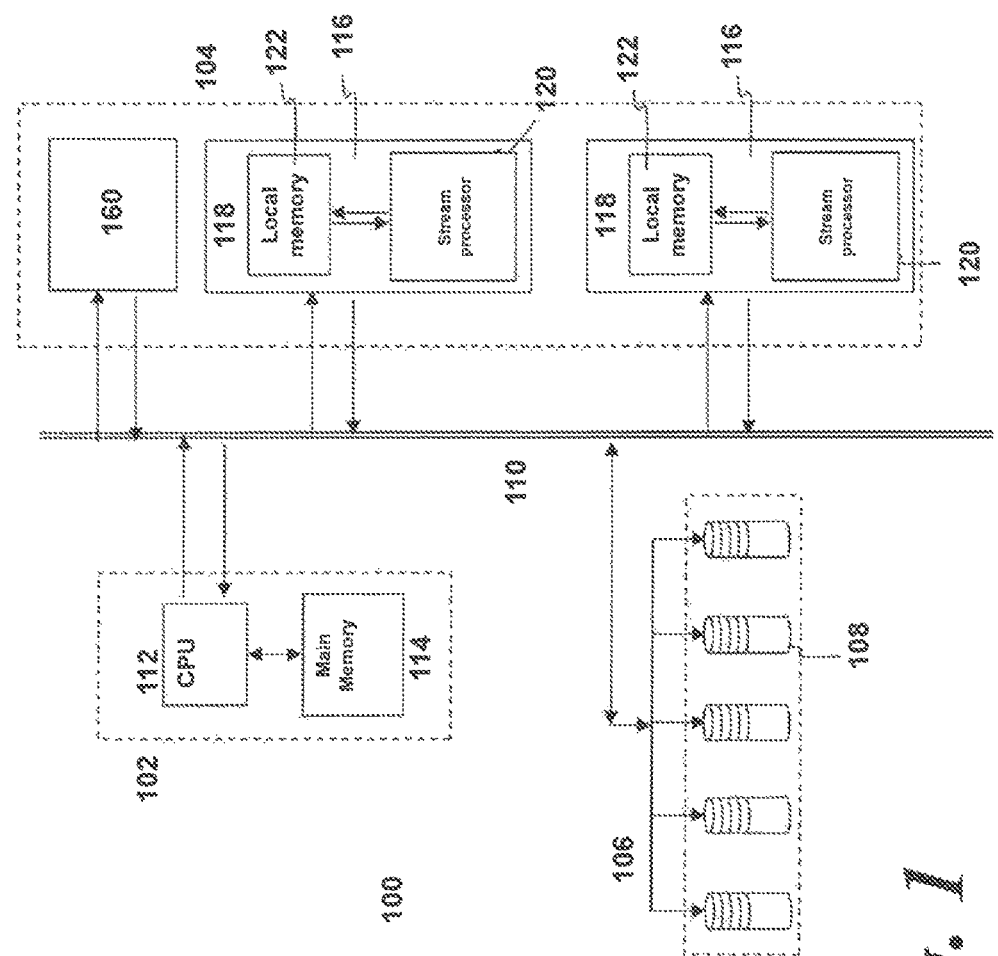
FIG. 1 is a schematic illustration of a data processing computing apparatus comprising a single client node, a single server node and network addressed storage connected across a network.

FIG. 1 shows a schematic view of a schematic networked computing apparatus 100 comprising a client node 102, a server node 104 and network addressed storage (NAS) 106 comprising a plurality of hard drives or other storage devices 108. The above computing units are connected across a network 110.

The client node 102 comprises a Central Processing Unit (CPU) 112 having a main memory 114. The CPU 112 may take any suitable form and comprises a processor for carrying out the instructions of a computer program run on the computing device 100. Typically, the CPU 112 may comprise multiple cores and may be quad-core or have eight-cores. The CPU 112 is the primary element carrying out the functions of the client node 102 as is well known in the art. The CPU 112 is commonly located on a motherboard (not shown) which comprises the necessary contacts to supply the CPU 112 with power and to connect the CPU 112 to other components in the client node 102.

The main memory 114 is associated with the CPU 112 and comprises an area of RAM. The RAM may take, for example, the form of SRAM or Dynamic RAM (DRAM). As is common for many computing applications, the main memory 114 may be provided as a plurality of SRAM or DRAM modules. These modules can quickly be replaced should they become damaged or when greater storage capacity is required. The main memory 114 is able to communicate with the CPU 112 via the motherboard forming part of the client node 102.

One or more client applications may be run on the client node 102. Multiple client applications may be run on a single client node 102, or a single client node 102 may be allocated to a single client application. In the context of this disclosure, a client application is to be taken to mean a client-side service or program run on a client node 102 which is operable to access the server node 104 across the network 110.

In this embodiment, the server node 104 is configured to connect to the network 110 and comprises at least one data flow engine (DFE) 116. A DFE 116 is a specialist co-processor operable to carry out specific types of calculation.

Whilst, for clarity, only two DFEs 116 are included in the server node 104 in the exemplary arrangement of FIG. 1, it would be readily apparent to the skilled person that additional DFEs 116 may be included to provide additional computational power. For example, any suitable number of DFEs 116 may be included in parallel or series within the server node 104, with each DFE 116 communicating to the CPU 112 and to each other.

Each DFE 116 comprises an accelerator card 118 on which is formed a stream processor 120 and a local memory 122. The local memory 122 is configured for fast access by the stream processor 120. Typically, the local memory 122 is of a large total size, for example, 24-48 GB. The local memory may include several different memory types, for example on-chip Static RAM (SRAM) and off-chip Dynamic RAM (DRAM), which may be utilized as a single memory or as multiple independent memories. It will be readily apparent to the skilled person the kinds and configurations of memories that will be suitable.

In this embodiment, the stream processor 120 comprises an FPGA-based stream processor. Different types of FPGAs may be used; however the larger and more arithmetic function-rich FPGAs are generally more desirable.

Figure 2:
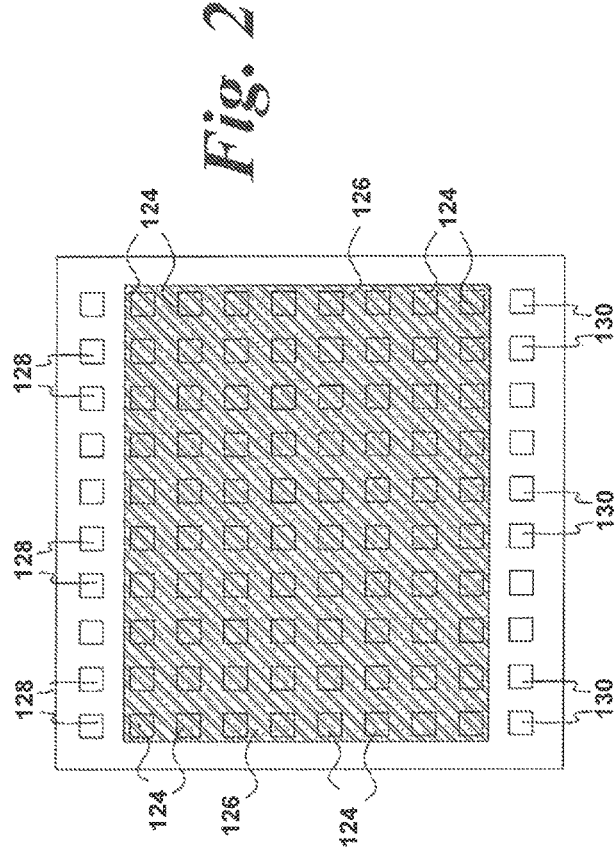
FIG. 2 is a schematic diagram of an FPGA stream processor forming part of the computing apparatus of FIG. 1.

FIG. 2 shows a schematic diagram of a stream processor 120 in the form of an FPGA. The FPGA stream processor 120 is an integrated circuit which is configurable after manufacture. The FPGA stream processor 120 comprises a programmable semiconductor device which comprises a matrix of configurable logic blocks (CLBs) 124 connected via programmable reconfigurable interconnects 126 (shown here as the shaded area in FIG. 2). The configuration of the FPGA interconnects 126 are usually specified using a hardware description language (HDL). The HDL is generally similar to that used for an application-specific integrated circuit (ASIC). In order to get data into and out of the FPGA stream processor 120, a plurality of inputs 128 and outputs 130 are provided.

Figure 3:
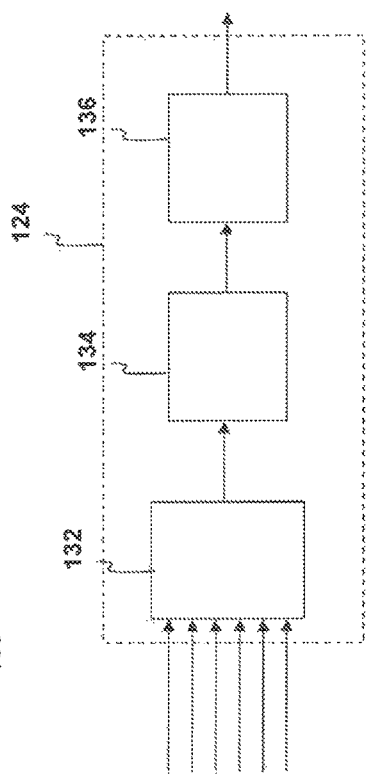
FIG. 3 is a schematic diagram showing a programmable logic block forming part of the FPGA stream processor of FIG. 2.

The CLBs 124 are the basic logic unit of the FPGA 120. A schematic diagram of a typical CLB 124 is shown in FIG. 3. The CLB 124 comprises a configurable switch matrix comprising typically a 4 or 6 input look up table (LUT) 132, some specialist circuitry (such as, for example, a multiplexer), one or more flip-flop units 134 which act as temporary memory storage and an output 136.

The LUT 132 of each CLB 124 can be configured to perform a variety of functions; for example, logic gates such as NAND and XOR, or more complex functions. A typical FPGA may comprise up to $10^6$ LUTs. The CLBs 124 are able to operate in parallel, providing a powerful resource for numerically-intense calculations.

FPGA-based stream processors comprise calculation functions mapped into circuit units along the path from input to output. The FPGA then performs the computation by streaming the data items through the circuit units. The streaming architecture makes efficient utilization of the computation device, as every part of the circuit is performing an operation on one corresponding data item in the data stream at any point during the calculation.

In an FPGA-based processor, a computational datapath is formed between the inputs 128 and the outputs 130. The computational datapath is implemented in the CLBs 124 and comprise arithmetic operations and buffer memory.

In operation, the data is streamed through the CLBs 124 of the FPGA stream processor 120 and the arithmetic operations are carried out on the data as it is streamed. This is in contrast to conventional processors in which instructions are generally processed sequentially, although some limited parallelism may possible on some processors.

Referring back to FIG. 1, whilst the above-described FPGA is a preferred type of stream processor forming part of the DFE 116, other types of processor may be used. Application Specific Integrated Circuits (ASICs) and/or structured ASICs. Indeed, a suitably configured CPU may be used under particular circumstances.

The NAS 106 may comprise any suitable storage device or devices. In one example, the NAS 106 may take the form of a redundant array of inexpensive disk (RAID).

There are a number of different RAID architectures, designated as RAID-1 through RAID-6. Each architecture offers disk fault-tolerance and offers different trade-offs in terms of features and performance. RAID controllers provide data integrity through redundant data mechanisms, high speed through streamlined algorithms, and accessibility to stored data for users and administrators.

RAID architecture provides data redundancy in two basic forms: mirroring (RAID 1) and parity (RAID 3, 4, 5 and 6). RAID 3, 4, 5, or 6 architectures generally utilize three or more disks of identical capacity. In these architectures, two or more of the disks are utilized for reading/writing of data and one of the disks stores parity information. Data interleaving across the disks is usually in the form of data "striping" in which the data to be stored is broken down into blocks called "stripe units". The "stripe units" are then distributed across the disks.

Therefore, should one of the disks in a RAID group fail or become corrupted, the missing data can be recreated from the data on the other disks. The data may be reconstructed through the use of the redundant "stripe units" stored on the remaining disks.

The client node 102, server node 104 (including a plurality of DFEs 116) and NAS 106 are connected together over the network 110. The network 110 may comprise any suitable high-speed network. For example, the network 110 may comprise a switched fabric computer network such as Infiniband, Ethernet or Fibre Channel.

In one example, the client node 102 and server node 104 may be located within the same computing cabinet or rack and the network 110 may be a local switched fabric network for example, PCI express. In other words, the client node 102 may be physically integrated with the server node 104 to form a single computational node in which the computational resources of the CPU 112 and DFEs 116 are connected together by an internal switched fabric such as PCI express.

Alternatively, the client node 102 and server node 104 may be remote from one another and the network 110 may comprise a high-speed local area network (LAN) or internet connection.

A resource controller 160 is also provided. In this embodiment, the resource controller 160 forms part of the server node 104 and may comprise either a hardware-based component in the server node 104 or may take the form of a software application layer run on the server nodes 104. However, it is to be understood that the resource controller 160 may comprise a separate entity from the client nodes 102 and the server nodes 104 as exemplified in the embodiment of FIG. 4.

The resource controller 160 functions as a resource manager and is operable to monitor workload activity on the server node 104 and the DFEs 116. The resource controller 160 may do this utilizing the network 110 or may monitor the server node 104 and corresponding DFEs 116 directly if located on-server as shown in FIG. 1.

In use, client applications are run on the client node 102. The client applications may comprise programs which require complex computations to be performed. Part of the computation may be performed on the CPU of the client node 102, whilst other parts of the computation are performed on the DFE 116 located on the server node 104. Data is transferred between these two computational elements over the network 110.

In use, the resource controller 160 has several operational functions. In use, the resource controller 160 is operable to distribute resources to the client applications when requested. The resource controller 160 is also operable to monitor the load on the DFEs 116 within the server node 104. Further, the resource controller 160 is operable to manage the expansion and contraction of DFE 116 resources allocated to client applications run on the client nodes 102 as will be described later.

FIG. 1 illustrates a simple example where there is a single client node 102 and a single server node 104. However, in practice, this configuration is relatively limited. In general, known network systems are operable to transfer data between the client nodes 102 and the NAS 106. Therefore, the client node 102 and server node 104 must be coupled to one another; for example, by a PCI express connection.

However, for many calculations, this arrangement is inefficient. For example, in many calculations, the CPU 112 and DFE 116 are not utilized contemporaneously—the CPU 112 may perform certain calculations (and be under heavy load) before data is sent to the DFE 116 for further calculations to be performed. Therefore, it may be the case that the CPU 112 and DFE 116 are alternately under load, so that the CPU 112 may be idle whilst the DFE 116 is performing a computation, and vice versa.

In general, in known arrangements, it is not possible to share a workload between different server nodes 104 and/or processors such as the DFEs 116 because the data for the computation is specific to a particular client node 102 or co-processor.

However, this disclosure addresses this issue. For the first time, this disclosure addresses co-processors such as DFEs 116 as independent network resources. The DFEs 116 can then be shared between client nodes 102, resulting in improved application performance.

This decoupling of the client and server nodes 102, 104 enables resource sharing and full utilization of the available computing resources. In this embodiment, it is desired to enable a multiplicity of client nodes 102 to connect across a network to a multiplicity of server nodes 104. This enables a greater number of tasks to be carried out simultaneously, and provides for resource sharing in which the resources can be equally and appropriately utilized.

Figure 4:
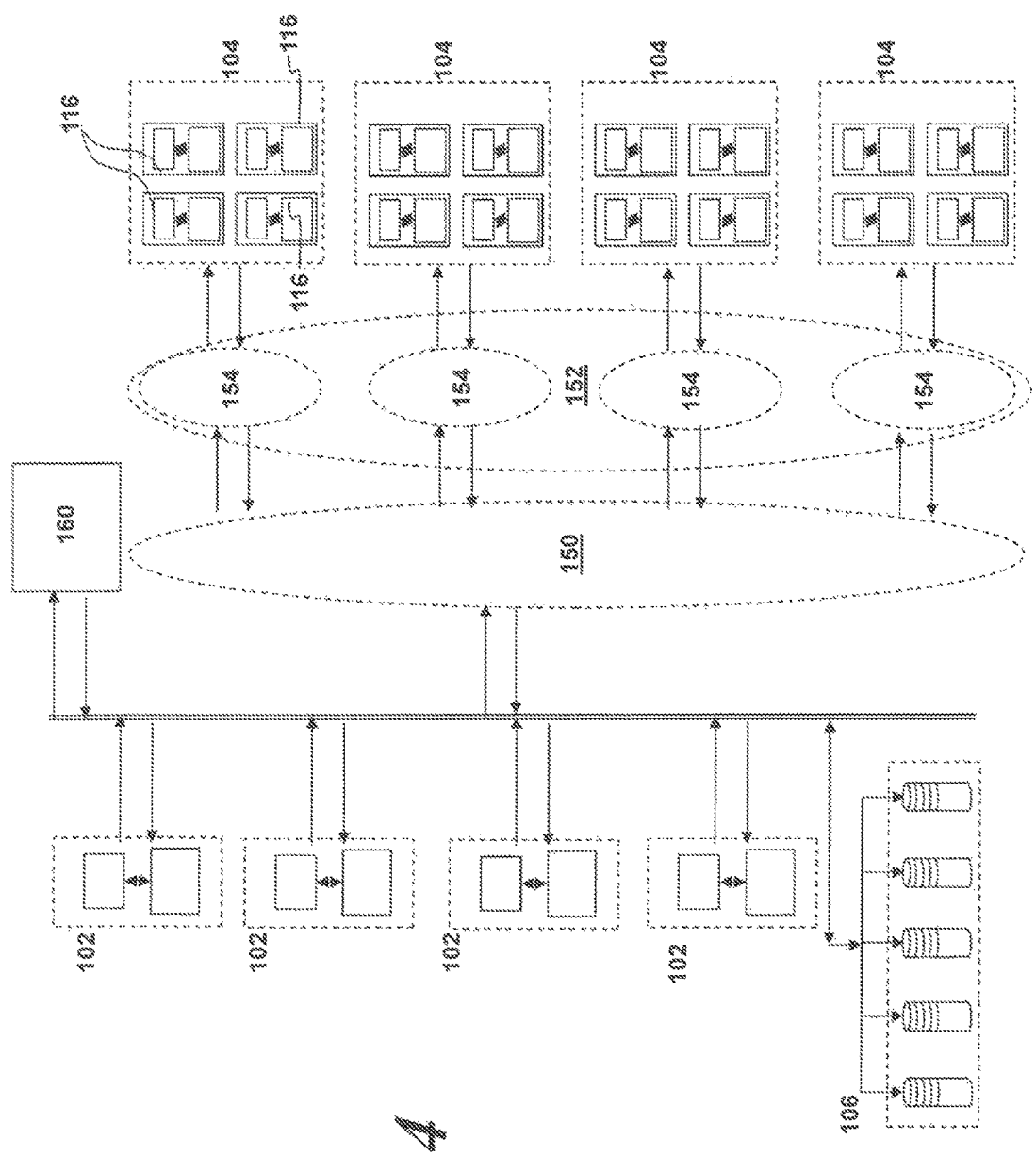
FIG. 4 shows a virtualized computing environment in which many client nodes are able to connect to multiple server nodes across a network.

FIG. 4 shows an exemplary embodiment of this disclosure. FIG. 4 shows a many to many virtualized configuration in which a plurality of client nodes 102 connect to virtualized resource layer to access server node-based DFEs 116.

In FIG. 4, only the DFEs 116 of one of the server nodes 104 are labelled for clarity. However, it is to be understood that each of the server nodes 104 comprises one or more DFEs 116. Whilst not labelled in FIG. 4, it is to be understood that the configuration of each DFE 116 shown in FIG. 4 corresponds generally to the configuration of DFE 116 shown in FIG. 1, i.e. comprising at least a stream processor 120 and a local memory 122.

A resource controller 160 is also provided in this embodiment as an allocator/load balancer and this will be described in detail later.

In terms of resource allocation, instead of a plurality of client nodes 102 being assigned particular DFEs 116 directly, it is preferred to provide the virtualized DFE interface. The virtualized DFE interface defines, to the client nodes 102, a plurality of virtual resources which the client nodes 102 access as will be described below.

In this embodiment, two layers of virtualized resources are provided. Firstly, an inter-server virtualized resource layer 150 is provided. The inter-server virtualized resource layer 150 functions as a request layer for client node 102 resource requests and enables management of the server resources.

Secondly, an intra-server resource layer 152 is provided. The intra-server resource layer 152 comprises one or more intra-server virtual resources 154. Each virtual resource 154 is specific to a particular server node 104 and is an in-server mechanism to manage and enable access to a number of DFEs 116 local to the server node 104. In other words, a virtual resource 154 may be presented to the client node 102 as a single DFE 116 on the server 104, whilst the actual physical DFE 116 resources are managed by the server 104 itself.

An example of a virtual resource 154 is shown in FIG. 4a. In FIG. 4a, a single server node 104 is shown. The exemplary server node 104 comprises four DFEs 116. However, any number of DFEs 116 may be provided as required.

A single virtual resource 154 formed in the intra-server virtual layer 152 is shown in FIG. 4a. The virtual resource 154 comprises a plurality of FIFO queues 156. Requests from client nodes 102 are arranged in the queues, with one queue per client application in this embodiment. Alternatively, each virtual resource 154 may comprise only a single queue as will be described later. In such an arrangement, multiple client applications may input data into the single queue in a particular order or with an identifying flag or marker to denote the data from a particular client application.

As shown, a single virtual resource 154 may accept processing requests from multiple client applications due to particular properties of the computational data as will be described below. Alternatively, a single virtual resource 154 may be used by only a single client application as required.

Further, whilst FIG. 4a is shown illustrating a single virtual resource 154, it is to be understood that a plurality of virtual resources may be present on a single server node 104, with each virtual resource 154 accessing mutually exclusive DFEs 116.

In essence, a client application running on a CPU 112 sends data to a virtual resource 154 for processing and the server node 104 or resource controller 160 controls which, or how many, DFEs 116 are actually addressed. It does not matter which DFE 116 within the virtual resource pool within a server node 104 is actually addressed. Therefore, the load on the DFEs 116 can be managed by distributing the workload across the DFEs 116 on the server nodes 104. In use, the DFEs 116 can be re-allocated or migrated between virtual resources, virtual resources can be coalesced or DFEs 116 can otherwise be dynamically utilized to maximize resource allocation and efficiency.

Further, DFEs 116 may be allocated in collective groups or arrays. Whilst embodiments describe the smallest unit or quantum of processing resource as a single DFE 116 which can be independently allocated to a virtual resource 154, it is to be understood that this need not be so.

In the present disclosure, the quantum of processing resource may be defined as an array or collective group of two or more DFEs 116. The DFEs 116 may be physically connected (e.g. formed on the same accelerator card) or they may comprise separate physical units but be assigned collectively for computational purposes.

Therefore, the herein-described embodiments referring to "a DFE 116" as the quantum of processing resource are to be understood to be equally applicable in the situation where a collective group of DFEs 116 are defined as the quantum of processing resource. For the avoidance of doubt, the term "physical processor" is intended to cover such groups of processors.

In one operational scenario, it may be that a virtual resource 154 is established which has no DFEs 116 assigned to it. If, for example, the workload to a particular virtual resource 154 is completed and the queue(s) 156 of that virtual resource 154 are empty, then no DFEs 116 may be assigned to it pending an incoming computational workload that requires DFE 116 resources. Alternatively, the virtual resource 154 may have just been allocated and may be awaiting, or have just received, a workload prior to any DFEs 116 being allocated to it.

The virtualization of the DFEs 116 within a plurality of server nodes 104 and the resulting properties thereof are possible due to an previously-unexploited property of the data processing carried out using co-processors such as stream processors and the manner in which stream processors perform calculations.

A conventional CPU or graphical processor unit (GPU) utilizes a local memory for performing calculations. The local memory and cache of the CPU or GPU is used constantly as data is stored and then operated on during the calculation. Thus, a conventional CPU or GPU has a dynamic state whilst in use which is, by definition, specific to a particular CPU or GPU. In other words, because the resource is dynamic and changing in use, the state of the resource is unknown whilst the resource is being used.

As a result, a CPU needs to have specifically allocated resources (such as an associated CPU or GPU) which cannot be expanded-on or migrated. If new resources are to be added or resources are to be migrated, then the current state of the resource must be copied to the new or migrated-to resource. This in turn requires that the current state of the resource is known and unchanging, so the resource cannot be used during the time when the copying is taking place. This is clearly undesirable in the context of high performance computing. Therefore, as set out above, a workload cannot be virtualized or shared between conventional CPUs or GPUs because all of the data is dynamic during a calculation and thus the state of the resource is unknown.

In contrast, the data for programs and calculations performed using a processor or co-processor such as a stream processor can often be separated into two parts: a dynamic part D and a static part S. This is shown in FIG. 4b.

FIG. 4b shows a schematic diagram of a DFE 116 comprising a stream processor 120 and a local memory 122. The static part S of the data includes at least two parts—static reference data $S_d$ stored in local memory (which could be either or both of on-chip 120 or off-chip local memory 122) and static program configuration data $S_p$.

The static reference part $S_d$ of the program is stored as data in the local memory 122 of the DFE 116. This data is, in essence, read only and will not change during the course of a calculation. The static program configuration data $S_p$ is data which is used to configure the stream processor 120 for a particular computational program or task.

The dynamic part D of the data is then streamed through the stream processor 120 and a computation performed thereon utilizing the static part of the data stored as read only data in the local memory 122. The dynamic part comprises a dynamic input $D_i$ and a dynamic output $D_o$. The dynamic output is the data resulting from the computation performed on the dynamic input data.

To illustrate the interaction between static and dynamic parts of a calculation, consider the example of gene sequencing. The static reference dataset ($S_d$) may, in this example, comprise the entire human genome, for example over 3 billion base pairs, while the static program configuration ($S_c$) may be for example an algorithm for matching short segments of genome to that reference. The dynamic input data ($D_i$) may be a set of short segments of genome to match, and the dynamic output data ($D_o$) the resulting match positions of those segments within the entire genome. This can be done using the stream processor 120 utilizing the static program data and accessing the static part of the data in the, essentially, read only local memory 122.

It is this property of the processing which occurs in a stream processor which enables a virtualized resource of coprocessors such as DFEs to be implemented at a system level. As noted above, this approach could not be used with a conventional CPU or GPU because there is no separation between the static data and dynamic data.

Whilst the above description has focused on stream processors, the present approach could be implemented on any suitable processor in which data can be partitioned into a static part and dynamic part at the system level. The skilled person would readily be aware of the types of data processors and associated hardware, and the types of program application and data calculations which would fall into this category and be suitable for use with embodiments disclosed herein.

In the context of stream processors such as the described DFEs 116, the static part of the data is stored in the local memory 122 and in the on-chip memory of the stream processor 120 within a DFE 116. Therefore, since the static part of the data is, by its very nature, unchanging, the static reference part of the data can be copied into the local memory 122 and on-chip memory of each physical DFE 116 in the virtualized DFE 154. As a result, any DFE 116 can be used within the virtualized DFE 150 as required without the need to copy or migrate data from one DFE 116 to another.

A further advantage of this arrangement of computational data is that it is possible for multiple client applications to share a single virtual resource 154 and, concomitantly, share the same DFE(s) 116. This is made possible by the separation of dynamic data part from the static data part in the computational process.

Considering the example of the gene sequencing illustrated above. In this example, the static data part of this computation comprises the program $S_p$ and the reference data $S_d$.

The dynamic part may again comprise dynamic input data ($D_i$) in the form of a set of short segments of genome to match, and dynamic output data ($D_o$) in the form of the resulting match positions of those segments within the entire genome.

Referring back to FIG. 4a, consider a situation where four client applications are each running a program using the same static reference data (the reference genome) but matching different segments of the genome to the reference data. In this arrangement, the four client applications can be assigned separate queues 156 to the same virtual resource 154 because although the dynamic data is different for each client application, all of these client applications share the same static reference data. Therefore, this approach enables powerful and efficient sharing of resources which would otherwise be impossible on conventional networked computing arrangements.

In order to manage the allocation of client nodes 102 to server nodes 104 and DFEs 116, it is necessary to provide a means to control and allocate resources. This is the function of an allocator/load balancer in the form of the resource controller 160 of this embodiment.

Traditionally, known networked load balancing systems are located directly in the path of the workflow. In other words, known load balancing systems sit in-path between the client and the server. In operation, known arrangements receive workload requests from the client nodes and distribute the workload requests to the most under-utilized system which is operable to handle the requests. The workload from the client, therefore, has to be passed through the load balancer.

This approach has many useful applications in, for example, web servers or portals. It also has the advantage that the load balancer can also act as a protective gateway between the client and the server. In the event of, for example, a distributed denial of service attack (DDoS), the load balancer could simply block client requests to a particular server and protect that server from being overloaded.

However, in the context of high performance computation involving calculations from client applications, the presence of the load balancer is unwelcome. An in-path load balancer has to receive a workload from the client, decode and interpret it, and allocate the workload to an appropriate server resource. This process results in a significant amount of latency which is undesirable in a high performance computing environment. In addition, since in high performance computing environments clients are connected to high bandwidth networks, the load balancer can also easily become a bottleneck in data throughput between clients and servers.

Furthermore, if an in-line load balancer wishes to add policies to enforce any parameters of the service (for example, quality of service) for the clients then this adds further latency.

The resource controller 160 will now be described. In this embodiment, the resource controller 160 comprises a separate entity from the client nodes 102 and the server nodes 104 and is connected to the network 106. However, this need not be the case and the resource controller 160 may be incorporated into one or more of the server nodes 104 either as a hardware add-on in the respective server node(s) 104 or as a software application layer run on one or more of the server nodes 104.

The resource controller 160 functions as a resource manager and is operable to monitor globally activity across the server nodes 104. Through the network, the resource controller 160 has knowledge of the server nodes 104 on the cluster and can discover their resource content.

The resource controller 160 has several operational functions. In use, the resource controller 160 is operable to distribute resources to the client applications when requested. The resource controller 160 is also operable to monitor the load on the DFEs 116 within the server nodes 104. Further, the resource controller 160 is operable to manage the expansion and contraction of virtualized resources 154 allocated to client applications run on the client nodes 102. Finally, the resource controller 160 is operable to hold the initialization data for the DFEs 116 and to migrate DFEs 116 and notify client nodes 102 of this migration if required.

These tasks will be illustrated with regard to FIGS. 5 to 13.

Figure 5:
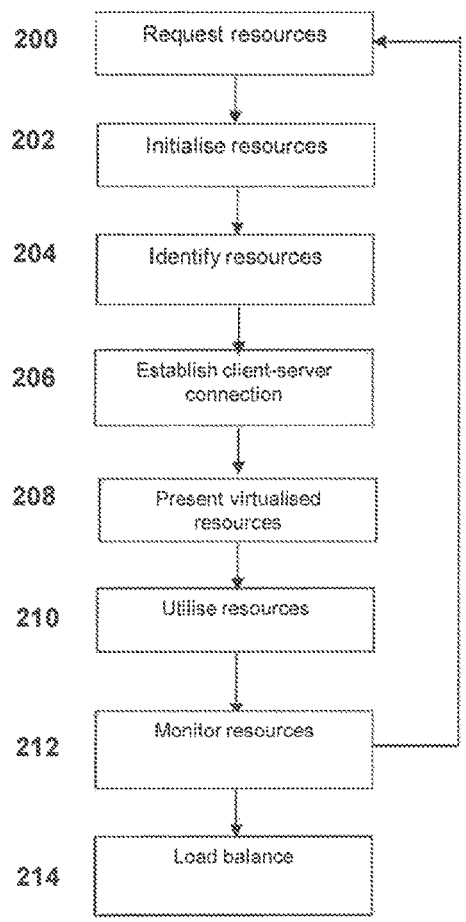
FIG. 5 is a flow chart showing a method of operation according to a first exemplary embodiment of this disclosure.

FIG. 5 shows a flow chart illustrating a first exemplary embodiment of this disclosure.

Step 200: Request Resources

At step 200, a client application running on a CPU 112 of a client node 102 requires DFE 116 computational resources.

Upon initialization, a client application running on a client node 102 does not have awareness of the server nodes 104. Instead, the client application is only aware of the resource controller 160. A request is then sent from the client node 102 to the resource controller 160 to request the required resources.

The method proceeds to step 202.

Step 202: Initialize Resources

At step 202, the client application running on a client node 102 provides the resource controller 160 with the necessary data to initialize the required DFEs 116 on the client application's behalf. This may comprise the necessary static reference data which will, in use, be stored in the local memory 122 of each DFE 116 involved in the calculation, and/or the DFE configuration representing the computational operations to be performed.

Alternatively, instead of the resource controller 160 being provided with the necessary static initialization data, this data may be held by the client node 102 or the server node 104.

As a further alternative, the initialization data may comprise multiple portions held in different locations. For example, as set out above, the initialization data may comprise a reference data part and a program data part. The static program data part may be in the form of, in a non-limiting example, FPGA configuration data.

The program data part may be held on the resource controller 160 or the server node 104, whereas the reference data part may be held on the client node 102.

The client application may request a specific number of DFEs 116 to be initialized with the same static data. Alternatively, the client application may request DFEs 116 connected in a specific topology where each resource in the topology has its own initial static data. Furthermore, the client application may request a number of multiples of a particular topology of DFEs.

The method proceeds to step 204.

Step 204: Select Resources

At step 204, the resource controller 160 selects appropriate unused DFEs 116 and communicates directly to the relevant server nodes 104 to initialize those DFEs 116 with the supplied initial static data. Optionally, the server nodes 104 may also keep a copy of the initial static data.

As set out above, the actual process of initialization of the relevant DFEs 116 will depend upon where the initialization data is held. For example, if it is held on the resource controller 160, the resource controller 160 may send that data to the relevant DFEs 116 directly, or to the server nodes 104 on which those DFEs 116 reside.

Alternatively, if the server nodes 104 hold the initialization data, then these nodes 104 can initialize the relevant DFEs 116 internally.

In a further permutation, if all or part of the initialization data is held on one or more client nodes 102, then this data will need to be transferred to the relevant DFEs 116 or controlling server nodes 104. This may be done in response to a command from the resource controller 160 to the client node(s) 102, or this may be scheduled to occur automatically from the client node(s) 102 to the server nodes 104.

In a further alternative, if initialization data is stored on the client node(s) 102, then the transfer of initialization data may not occur at all in this step. Instead, appropriate DFEs 116 may be allocated in this step and the necessary initialization data sent when the resources are first used by the client application in step 210.

The method proceeds to step 206.

Step 206: Identify Resources

At step 206, the identities of the relevant server nodes 104 which are selected and initialized in step 204 are passed to the client application running on the client node 102. This may be done by passing the network address of the relevant server node or nodes 104 to the client node 102.

Step 208: Establish Client-Server Connection

At step 208, the client node 102 running the client application can then connect directly to the relevant server node or nodes 104 identified in step 206. This connection is done independently of the resource controller 160. In other words, in contrast to known load balancing arrangements, the resource controller 160 is not located in the data path between the client node 102 and the server node 104.

The method then proceeds to step 208.

Step 208: Present Virtualized Resources

The load-balancing of the system relies on the fact that the physical DFEs 116 are presented to the client nodes 102 in the form of virtual resources 154 specific to each server node 104 but presented through a common inter-server virtualization layer 150.

If required, multiple virtual resources 154 (running on different server nodes 104) may be allocated to a single client application through the inter-server virtualization layer 150.

The virtual resources 154 are managed on the respective server 104 managing the particular physical DFEs 116 which are allocated to the virtual resource 154. In other words, the virtual resource 154 is presented to the client application running on the client node 102 as a single instance of the DFE 116 resource, or DFE resource topology. Internally within the server node 104 all the physical DFEs 116 allocated under the virtualized resource 154 are utilized. Hence, the client application will benefit from utilization of more resources. This provides an in-server automatic load balancing by automatically distributing the workload from a client application across the physical DFE 116 resources under the allocated virtual resource 154.

Figure 6A:
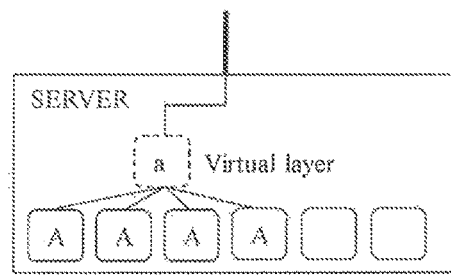
FIGS. 6a and 6b show an example of a virtualized layer within a server node.
Figure 6B:
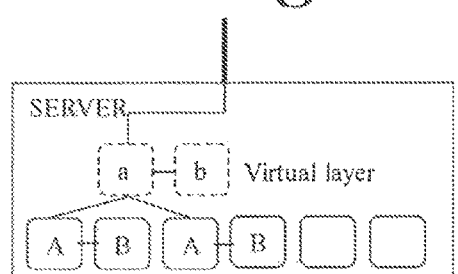

An example of this is shown in FIGS. 6a and 6b. In FIG. 6a, a client application sees a single virtual resource a. However, the workload is actually distributed across four physical DFEs 116. In FIG. 6b, a single virtual resource of two connected DFEs a, b is presented to the client application.

It is further noted that, at particular times, a virtual resource 154 may be provided and be visible to the client application but have no physical DFEs 116 allocated thereto. This situation may occur where a workload for a virtual resource 154 is queued in a queue 156 and the virtual resource 154 is waiting for one or more physical DFEs 116 to become available.

The client application is unaware of the actual number of physical DFEs 116 (if any) that are allocated to a particular virtual resource 154. The client application merely sees a virtual resource 154 to which a workload is to be sent.

The method proceeds to step 210.

Step 210: Utilize Resources

At step 210, the client application can then access the requested DFEs 116 to perform workload calculations as required. Once steps 200-208 have been completed for one or more client applications, the client applications are able to use the virtualized DFEs 154 set up in the above process and will send workloads to these virtualized DFEs 154. As part of this, the server nodes 104 hosting the relevant DFEs 154 will manage the dispatch of tasks from the virtual resource 154 to the appropriate physical DFE 116. This is done by assigning the workloads to client application-specific queues 156 as shown in FIG. 4a.

The above steps may occur for multiple client applications simultaneously. In variations, client applications that require the same type of DFE 116 allocation can specify the same DFE 116 allocation and share the DFE 116 resources.

The resource controller 160 denotes shared allocations as a single allocation of a virtual resource with multiple client applications. Furthermore, the allocation of physical DFEs 116 to a virtual resource 154 can be specified relative to another virtual resource 154. The ratio between these two DFE allocations will be maintained by the resource controller 160 as the resource controller 160 load balances the resources 154 amongst the client applications on the networked system.

Step 212: Monitor Resources

Subsequent to step 210 above, when client applications are running using the DFEs 116 the resource controller 160 monitors the workload on each of the DFEs. If the resource controller 160 detects underused or free resources in the system then the system moves to step 214 to perform load-balancing.

As described above, each server node 104 is able to manage local physical DFE 116 resources allocated to a virtual resource 154. In contrast, the resource controller 160 is also operable to monitor the workloads across all server nodes 104 as well as within the server nodes 104. The resource controller 160 can then reallocate or migrate DFE resources as required to maintain optimum utilization and efficiency in the networked system as will be described below.

The resource controller 160 monitors the workloads at multiple levels. On the level of the intra-server virtualization layer 152, the resource controller 160 monitors the queues 156. If the length of the queue(s) 156 assigned to a particular virtual resource 154 is increasing, then it is clear that the virtual resource 154 is over-utilized. In contrast, if the queue length is minimal or decreasing too quickly, then the virtual resource 154 is under-utilized.

The resource controller 160 also monitors the actual utilization of the DFE 116 hardware. This may comprise, for example, monitoring the number of clock cycles of the or each DFE 116 in a predetermined time period which were spent processing a data workload as opposed to being idle. Alternatively, other indirect measurements could be monitored, for example characteristics of the hardware such as temperature and power consumption.

On a DFE 116 level, as described above, the server nodes 104 are operable to manage the sharing of workload between the DFEs 116 assigned to a particular virtual resource 154. However, the resource controller 160 is also operable to monitor the utilization of DFEs 116 within a particular virtual resource 154 and reallocate workload between the DFEs 116 if required.

It is noted that this monitoring process does not interfere with the workloads sent across the network 110 between the client applications and the server nodes 104 because the resource controller 160 is not in-line with the workflow. This is in contrast to known where a load balancer intercepts the workloads on the network and redirects them to underused resources.

Step 214: Load Balance

At step 214, the resource controller 160 load balances the server nodes 104. For example, this may mean that the physical DFE 116 resources associated with a virtual resource 154 are increased.

The resource controller 160 will also implement policies such as maintaining any specific ratios between the physical sizes (i.e. DFE 116 allocation) of virtual resources 154 if any relative ratios have been specified when instantiating the allocation in steps 200 and 202. The resource controller 160 is then able to take action to ensure that the workload is distributed appropriately across the available resources as will be described in the next section.

As set out above, the load balancing is carried out by the resource manager 160 monitoring the queue lengths for the queue(s) 156 assigned to a particular virtual resource 154. The resource manager 160 is also operable to load balance between the DFEs 116 assigned to a particular virtual resource 154.

Further, should additional client applications request access to resources, then the resource controller 160 will complete steps 200 to 210 for these client applications.

The resource controller 160 is operable to load balance and take specific actions in each case as will be described below. The following examples are intended to form part of step 214 as appropriate.

Example 1

In-Server Elasticity

Example 1 is illustrated with respect to FIGS. 7 and 8a-8c.

Step 300: Identify Disparity

Figure 8A:
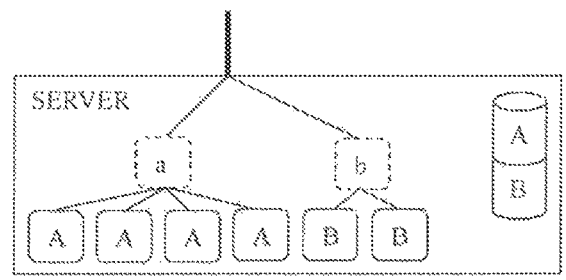
FIGS. 8a to 8c show an example of elastic resource re-allocation within a server node.
Figure 7:
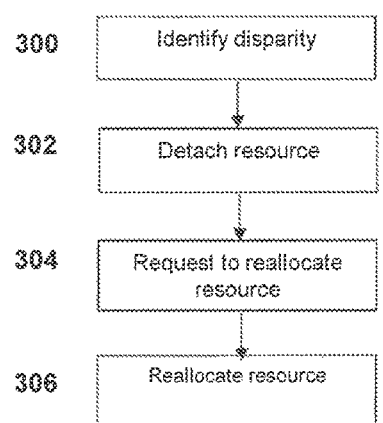
FIG. 7 is a flow chart showing a method of operation according to a second exemplary embodiment of this disclosure.

At step 300, the resource controller 160 detects a disparity between usage of the sets of physical DFE 116 resources in a particular server node 104. An example of this is illustrated in FIG. 8a. In FIG. 8a, client applications A and B require equal resources and are utilizing virtual resources a and b respectively.

However, whilst four physical DFEs A are allocated to virtual resource a, only two physical DFEs B are allocated to virtual resource b. Therefore, virtual resource b is over-utilized compared to virtual resource a which is under-utilized. This may be identified by means of a large or increasing queue length for virtual resource b, but a small, non-existent or decreasing queue length for virtual resource a.

The method proceeds to step 302.

Step 302: Detach Resource

Once the disparity is identified in step 302, then the resource controller 160 is operable to change the allocated physical DFE 116 resources within the server node 104. This is performed without any interruption or effect on the workload streams from the client nodes 102.

Figure 8B:
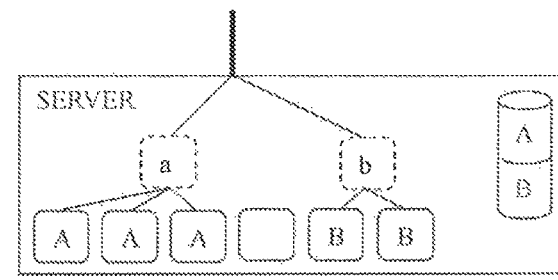

The first stage in this is shown in FIG. 8b and is to detach the physical DFE resource A from virtual resource a. This physical resource becomes free and unallocated.

The method proceeds to step 304.

Step 304: Request to Reallocate Resource

Figure 8C:
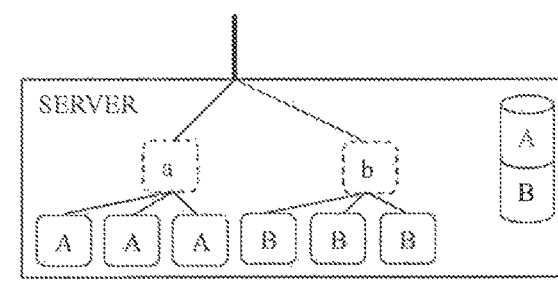

The freed physical DFE resource is then attached to virtual resource b as shown in FIG. 8c. At step 304, the resource controller 160 requests the server node 104 to attach the free resource to virtual resource b.

The method proceeds to step 306.

Step 306: Reallocate Resource

At step 306, the server node 104 firstly initializes the resource now attached to virtual resource b using the local data. This may include loading the static reference data into the local memory 122 of the physical DFE 116. The physical DFE resource 116 is then attached to the virtual resource b.

The client applications a and b will not be aware of the changes taking place on the server—there is no need to stop and restart the workflow so there is no cost in the migration of the resource from one application to another. The server has a copy of the initial data so there is no need to retrieve this from the application or resource controller 160. This process can also be performed with connected topologies of more than one DFE resource.

Example 2

Cross-Server Migration and Elasticity

Figure 9:
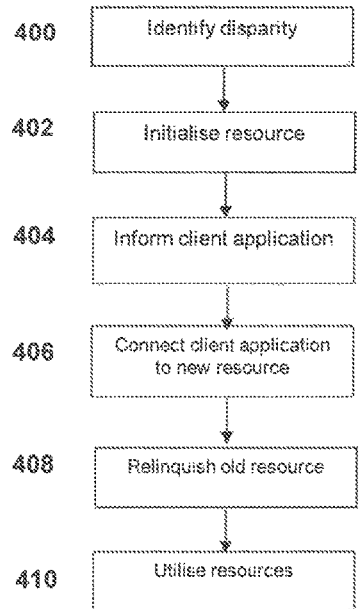
FIG. 9 is a flow chart showing a method of operation according to a third exemplary embodiment of this disclosure.

Example 2 is illustrated with respect to FIGS. 9 and 10a-10d. FIG. 9 is a flow chart illustrating the method steps of this example. FIGS. 10a to 10d illustrate schematically the processes involved in the described example.

Step 400: Identify Disparity

At step 400, the resource controller 160 detects a disparity between usages of the sets of physical DFE 116 resources across different server nodes 104.

Figure 10A:
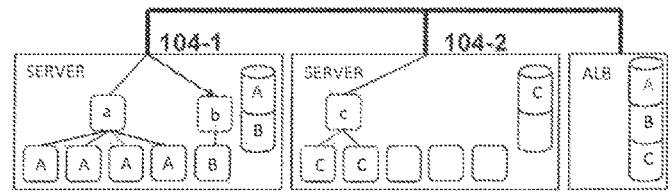
FIGS. 10a to 10d show an example of resource migration between server nodes.

An example of this is illustrated in FIG. 10a. In FIG. 10a, client applications A, B and C require equal resources and are utilizing virtual resources a, b and c respectively. Virtual resource a has four physical DFEs A allocated thereto on server node 104-1. However, virtual resource b only has a single DFE B allocated thereto on server node 104-1. Virtual resource c has two physical DFEs C allocated thereto on server node 104-2.

On the first server node 104-1, virtual resource b is over-utilized. However, server node 104-2 comprises free resources. Therefore, in this situation, the system would benefit from moving client applications using virtual resource b to use resources on server 104-2. The resource controller 160 will co-ordinate this process.

First, at step 400, the resource controller 160 identifies the over-utilized resource allocation b on server node 104-1 and also the free resources on server node 104-2. The free resources may have been created by an earlier operation to relinquish the resources, or may simply not yet have been allocated.

The method proceeds to step 402.

Step 402: Initialize Resource

Figure 10B:
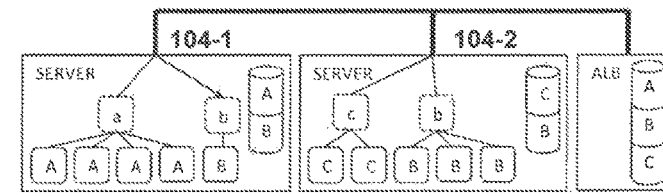

Once the disparity is identified in step 402, then the resource controller 160 is operable to change the allocated server nodes 104 for virtual resource b. As shown in FIG. 10b, the resource controller 160 then establishes the virtual resource b on server node 104-2 and initializes the physical DFE resources 116 therein with the necessary static reference data stored in the resource controller 160.

The method then proceeds to step 404.

Step 404: Inform Client Application

Figure 10C:
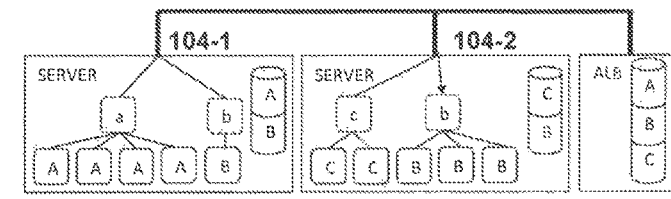

At step 404, once the new virtual resource b is initialized on server 104-2, the resource controller 160 informs the client application (or multiple applications if the virtual resource b is shared) that the new virtual resource b is available. The resource controller 160 also provides the address of the server node 104-2 to which the workload is to be sent. This is shown in FIG. 10c.

The method proceeds to step 406.

Step 406: Connect Client Application to New Resource

At step 406, the client application utilizes the network address of the new virtual resource b on the server node 104-2 and establishes a connection to this new virtual resource b.

The method proceeds to step 408.

Step 408: Relinquish Old Resource

Figure 10D:
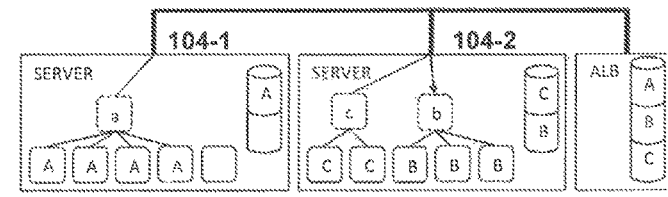

The client application B then relinquishes the old virtual resource b located on server 104-1 and accesses the resource b on server 104-2 alone. This is shown in FIG. 10d.

The old resource allocation for former virtual resource b on server 104-1 will then become a free resource when the application has disconnected from the server 104-1.

Example 3

Resource Balancing Across Multiple Servers

The above examples relate to situations where resources allocated to a particular client application are either allocated more physical resources within a server, or migrated to a different server having greater resource capacity.

However, it is possible, and often advantageous, for two or more virtual resources 154 to be balanced across multiple server nodes 104. This has advantages in terms of efficient and balanced utilization of the physical DFEs 116 on the server nodes 104, and can allow a larger number of physical DFEs 116 to be allocated to a virtual resource than are available on any single server 104, because a given workload can be split across multiple server nodes 104. Therefore, this enables solutions to load balancing that cannot be achieved through management of in-server physical resources alone.

Example 3 relates to such cross-server load balancing. Example 3 is illustrated with respect to FIGS. 11 and 12a-12d. FIG. 11 is a flow chart illustrating the method steps of this example. FIGS. 12a to 12d illustrate schematically the processes involved in the described example.

Step 500: Monitor Loads

Consider a situation such as that illustrated in FIG. 12a. FIG. 12a is similar to FIG. 10a, and shows a situation where client applications A, B and C are utilizing virtual resources a, b and c respectively. Virtual resource a has four physical DFEs A allocated thereto on server node 104-1. Virtual resource b only has a single DFE B allocated thereto on server 104-1. Virtual resource c has two physical DFEs C allocated thereto on server node 104-2.

Client application a has access to four physical DFE 116 resources on server 104-1. However, client application a now requires greater resources, for example, seven physical DFE 116 resources. This cannot be provided by server 104-1 alone.

At step 500, the resource controller 160 identifies that server 104-1 cannot meet the required resource allocation a on server node 104-1 and also notes the free resources on server node 104-2. The free resources may have been created by an earlier operation to relinquish the resources, or may simply not yet have been allocated.

The method proceeds to step 502.

Step 502: Initialize Additional Resource

Once the need is identified in step 500, then the resource controller 160 is operable to initialize multiple allocated server nodes 104 for virtual resource a. As shown in FIG. 12b, the resource controller 160 then establishes the virtual resource a on server node 104-2 and initializes the physical DFE resources 116 therein with the necessary static reference data stored in the resource controller 160.

The method then proceeds to step 504.

Step 504: Inform Client Application

At step 504, once the new virtual resource for client application a is initialized on server 104-2, the resource controller 160 informs the client application a (or multiple applications if the virtual resource a is shared) that the additional virtual resource a is available. The resource controller 160 also provides the address of the server node 104-2 to which the workloads are also to be sent. This is shown in FIG. 10b.

The method proceeds to step 506.

Step 506: Allocate Weightings

In a configuration where virtual resources 154 assigned to a particular client application (or specific group of multiple client applications) are located on multiple server nodes 104 then each client application requiring the virtual resources 154 must maintain a connection to all of the server nodes 104 involved.

However, the client application needs an indication of which server node 104 to send the workload to at a given point. This is required in order to enable the client applications to spread the workload across the multiple server nodes 104 hosting the respective virtual resources 154.

In this regard, the resource controller 160 allocates each client application with a weight for a given virtual resource 154. The weights are stored by the client and are used to determine which server node 104-1 or 104-2 hosting the virtual resource 154 to send the workload to.

Considering the example of FIG. 12, virtual resource a comprises seven physical DFE 116 resources in total—four physical DFE 116 resources on server node 104-1 and three physical DFE 116 resources on server node 104-2. Therefore, the resource controller 160 updates the client application(s) a with a weighting of 4/7 for server node 104-1 and 3/7 for server node 104-2.

This ensures that the volume of the workload is distributed according to the available resources on each server node 104. In other words, in this example, for each workload task dispatch from the client node 102, four out of seven times the client node(s) 102 will dispatch the workload task to server node 104-1, and three out of seven times the client node(s) 102 will dispatch the workload task to server node 104-2.

For each individual task dispatch, the client node 102 can decide which server node 104 to send the workload task to by generating and comparing a random number to the weight allocated by the resource controller 160, and so determine which server node 104 to use without contacting the resource controller 160 each time a task is to be dispatched.

The advantage of this approach is that, once initialized, the workload tasks from the client applications will be regulated and balanced by the clients themselves with no interaction from the resource controller 160 once the initial weightings are set up.

Therefore, the resource controller 160 will not add latency to the computational process whilst ensuring that the workloads on the server nodes 104 are balanced.

Once the weights are initialized on the client applications and/or client nodes 102, the method proceeds to step 508.

Step 508: Connect Client Application to Resources

At step 508, the client application a utilizes the network address of the server node 104-2 and establishes a connection to server node 104-2. The client application is now connected to both server nodes 104-1 and 104-2 and can send workloads to both of these server nodes 104 hosting virtual resource a utilizing the weights allocated in step 506. To achieve this, two virtual resources 154 are set up, one on each server node 104-1, 104-2. However, both serve the same client application.

The method proceeds to step 510.

Step 510: Utilize Resources

At step 510, the client application a can then access the requested DFEs 116 on both server nodes 104-1 and 104-2 to perform workload calculations as required. As part of this, the server nodes 104 hosting the relevant DFEs 116 will manage that server nodes 104 local physical DFE 116 resource allocation to the respective virtual resource a.

The method proceeds to step 512

Step 512: Monitor Resources

Subsequent to step 510 above, when client applications are running on the server nodes 104 the resource controller 160 monitors the workload on the server nodes 104. If the resource controller 160 detects underused or free resources in the system then the system moves to step 514 to perform load-balancing.

As set out above, the resource controller 160 monitors the workloads at multiple levels. On the level of the intra-server virtualization layer 152, the resource controller 160 monitors the queues 156. If the length of the queue(s) 156 assigned to a particular virtual resource 154 is increasing, then it is clear that the virtual resource 154 is over-utilized. In contrast, if the queue length is minimal or decreasing too quickly, then the virtual resource 154 is under-utilized.

On a DFE 116 level, as described above, the server nodes 104 are operable to manage the sharing of workload between the DFEs 116 assigned to a particular virtual resource 154. However, the resource controller 160 is also operable to monitor the utilization of DFEs 116 within a particular virtual resource 154 and reallocate workload between the DFEs 116 if required.

As described above, each server node 104 is able to manage local physical DFE 116 resources allocated to a virtual resource. In contrast, the resource controller 160 is operable to monitor the workloads across all server nodes 104 as well as within the server nodes 104. The resource controller 160 can then reallocate or migrate DFE resources as required to maintain optimum utilization and efficiency in the networked system as will be described below.

It is noted that this monitoring process does not interfere with the workloads sent across the network between the client applications and the server nodes 104 because the resource controller 160 is not in-line with the workflow. This is in contrast to known approaches where a load balancer intercepts the workloads on the network and redirects them to underused resources.

The method proceeds to step 514.

Step 514: Load Balancing and Weighting

At step 514, the resource controller 160 load balances the server nodes 104. In this example, the resource controller 160 may notice that the weighting applied by the client node 102 controlling a client application are not resulting in optimum workload balancing. For example, for virtual resource a, server node 104-1 may be under-utilized and server node 104-2 may be over-utilized.

Whilst each server node 104 can balance a given workload within the physical DFE resources allocated to the respective server node 104. However, a given server node 104 cannot balance its own physical DFE resources with those of another server node 104.

If such a disparity is identified, the resource controller 160 may send updated weights to the client nodes 102 to alter this balance.

Therefore, indirect load balancing can occur on two levels. Firstly, the coarse-grain load balancing is achieved by the weights assigned by the resource controller 160 to each client application or client node 102. This determines the proportion of a workload allocated to a virtual resource which is sent from a given client application to a given server node 104 forming part of a virtual resource.

Then, fine-grain load balancing can occur within a given server node 104 by the server node 104 itself managing the allocation of the received workload to a specific physical DFE resources allocated to a particular virtual resource.

Neither of the above load balancing processes affect the workflow between client nodes 102 and server nodes 104. Therefore, efficient resource utilization and load balancing can be achieved with little or no latency impact on the computational hardware.

The above examples of multiple server node allocation to a single virtual resource have been described with regard to a situation where the resource controller 160 identifies over-utilization and allocates existing virtual resources as necessary. However, it is possible that the resource controller 160 would allocate multiple server nodes 104 to a virtual resource upon initialization of a connection. This is described with reference to FIG. 13.

Figure 13:
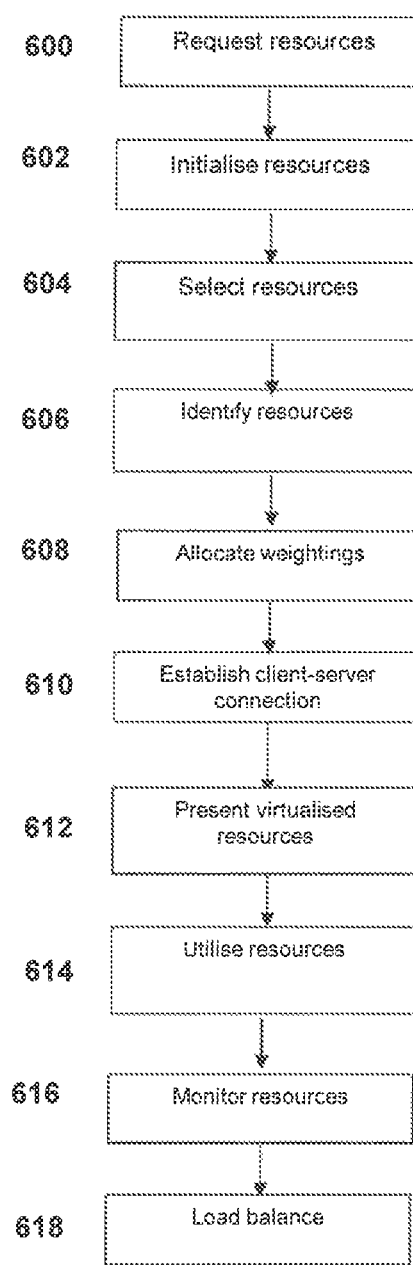
FIG. 13 is a flow chart showing a method of operation according to a fifth exemplary embodiment of this disclosure.

FIG. 13 is a flowchart illustrating a method according to another exemplary embodiment of this disclosure. This embodiment is similar to the embodiment of FIG. 5 except that multiple server nodes 104 are allocated to a virtual resource upon initialization of a connection.

Step 600: Request Resources

At step 600, a client application running on a CPU 112 of a client node 102 requires DFE 116 computational resources.

Upon initialization, a client application running on a client node 102 does not have awareness of the server nodes 104. Instead, the client application is only aware of the resource controller 160. A request is then sent from the client node 102 to the resource controller 160 to request the required resources.

The method proceeds to step 602.

Step 602: Initialize Resources

At step 602, the client application running on a client node 102 provides the resource controller 160 with the necessary data to initialize the required DFEs 116 on the client application's behalf. This may comprise the necessary static reference data which will, in use, be stored in the local memory 122 of each DFE 116 involved in the calculation and/or used to configure the DFE 116 to perform the appropriate computation.

The client application may request a specific number of DFEs 116 to be initialized with the same static data. Alternatively, the client application may request DFEs 116 connected in a specific topology where each resource in the topology has its own initial static data.

The method proceeds to step 604.

Step 604: Select Resources

At step 604, the resource controller 160 selects appropriate unused DFEs 116 and communicates directly to the relevant server nodes 104 to initialize those DFEs 116 with the supplied initial static data.

In this embodiment, the resource controller 160 determines that either a) no one server node 104 can meet the workload requirements of the client application requesting the resource or b) workload distribution would be more efficient to spread the client workload across multiple server nodes 104.

Therefore, the resource controller 160 communicates with two or more server nodes to initialize the respective physical DFE resources 116 on these server nodes 104. These resources form the virtual resource presented to the client application.

Optionally, the server nodes 104 may also keep a copy of the initial static data sent to them by the resource controller 160.

The method proceeds to step 606.

Step 606: Identify Resources

At step 606, the addresses of the relevant two or more server nodes 104 which are selected and initialized in step 604 are passed to the client application running on the client node 102. This may be done by passing the network addresses of the relevant server nodes 104 to the client node 102.

The method proceeds to step 608.

Step 608: Allocate Weightings

In step 508, the resource controller 160 allocates the client application with a weight for a given server node 104 hosting the virtual resource. The weights are stored by the client application and are used to determine which server node 104-1 or 104-2 hosting the initialized virtual resource to send the workload to. This ensures that the volume of the workload is distributed according to the available resources on each server node 104.

In one example, consider that the resource controller 160 has allocated two server nodes 104-1, 104-2. Server node 104-1 has three physical DFE resources implementing part of the requested virtual resource and server node 104-2 has two physical DFE resources implementing the other part of the requested virtual resource. Initially the resource controller 160 provides weights of {3/5, 2/5} to the client application.

Therefore, when the client application dispatches a task, 3/5 of the time it chooses server node 104-1 and 2/5 of the time it chooses server node 104-2.

For each individual task dispatch, the client node 102 can decide which server node 104 to send the workload task to by generating and comparing a random number to the weight allocated by the resource controller 160, and so determine which server node 104 to use without contacting the resource controller 160 each time a task is to be dispatched.

The advantage of this approach is that, once initialized, the workload tasks from the client applications will be regulated and balanced by the clients themselves with no interaction from the resource controller 160 once the initial weighting are set up.

Therefore, the resource controller 160 will not add latency to the computational process whilst ensuring that the workloads on the server nodes 104 are balanced.

Once the weights are initialized on the client applications and/or client nodes 102, the method proceeds to step 610.

Step 610: Establish Client-Server Connection

At step 610, the client node 102 running the client application can then connect directly to the relevant server nodes 104 identified in step 506. This connection is done independently of the resource controller 160. In other words, in contrast to known load balancing arrangements, the resource controller 160 is not located in the data path between the client node 102 and the server node 104.

The method then proceeds to step 612.

Step 612: Present Virtualized Resources

The load-balancing of the system relies on the fact that the physical DFEs 116 are presented to the client nodes 102 in the form of virtual resources 154. The virtual resource 154 is managed on each respective server node 104 managing the particular physical DFEs 116 which are allocated to the virtual resource 154.

The method proceeds to step 614.

Step 614: Utilize Resources

At step 614, the client application can then access the requested DFEs 116 to perform workload calculations as required. Once steps 600-608 have been completed, the client application is able to use the virtualized DFE 154 set up in the above process and will send workloads to the two or more servers 104 comprising the virtual resource based on the weights allocated in step 608. As part of this, the server nodes 104 hosting the relevant DFEs 154 will manage the dispatch of tasks to the local physical DFE 116 resources allocated to each virtual resource 154.

The method proceeds to step 616.

Step 616: Monitor Resources

Subsequent to step 614 above, when client applications are running on the server nodes 104 the resource controller 160 monitors the workload on the server nodes 104. If the resource controller 160 detects underused or free resources in the system then the system moves to step 618 to perform load-balancing.

As described above, each server node 104 is able to manage local physical DFE 116 resources allocated to a virtual resource. In contrast, the resource controller 160 is operable to monitor the workloads across all server nodes 104 as well as within the server nodes 104. The resource controller 160 can then reallocate or migrate DFE resources as required to maintain optimum utilization and efficiency in the networked system as will be described below.

It is noted that this monitoring process does not interfere with the workloads sent across the network between the client applications and the server nodes 104 because the resource controller 160 is not in-line with the workflow. This is in contrast to known where a load balancer intercepts the workloads on the network and redirects them to underused resources.

Step 618: Load Balance

At step 214, the resource controller 160 load balances the server nodes 104. For example, this may mean that the physical DFE 116 resources associated with a virtual resource 154 are increased.

During execution the resource controller 160 monitors the activity of server nodes 104-1 and 104-2 and may update the client application weights used by the client application for these server nodes 104. For example, if server 104-2 is under-utilized, the weights for the client application could be adjusted to {1/2, 1/2} to send more work to server 104-2 (1/2>2/5).

The above examples illustrate resource management of multiple client applications across multiple server applications. However, the computational data format and configuration of the computational resources enable a further permutation of operation in which a single virtual resource can handle multiple client applications. This will be illustrated with respect to FIGS. 14, 15*a* and 15*b*.

Figure 14:
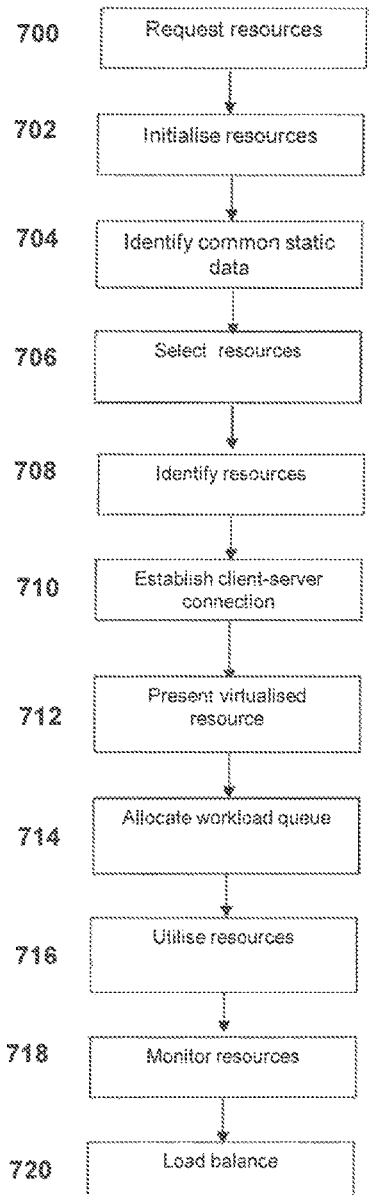
FIG. 14 is a flow chart showing a method of operation according to a sixth exemplary embodiment of this disclosure.

FIG. 14 is a flowchart illustrating a method according to another exemplary embodiment of this disclosure. This embodiment is similar to the embodiment of FIG. 5 except that multiple client applications are allocated to a single virtual resource upon initialization of multiple connections.

Figure 15A:
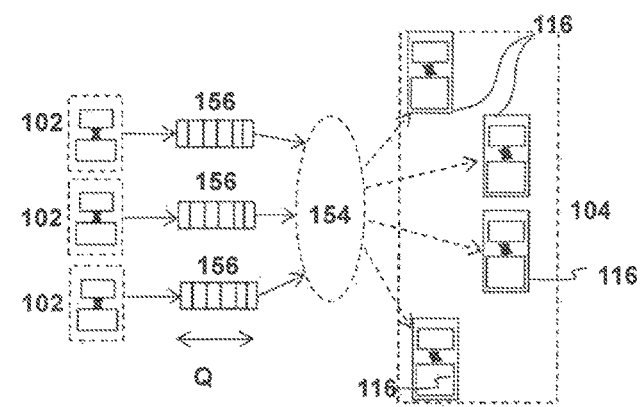
FIG. 15a shows a schematic diagram similar to FIG. 4a showing a single server node and virtual resource in more detail.
Figure 15B:
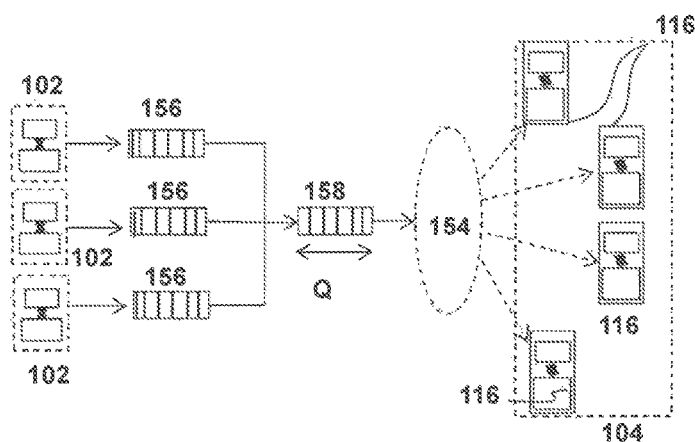
FIG. 15b shows a schematic diagram similar to FIG. 15a showing an alternative configuration of a single server node and virtual resource in more detail.

Further, FIGS. 15a and 15b illustrate two alternative configurations of such an arrangement. FIG. 15a illustrates a configuration similar to FIG. 4a where a single virtual resource 154 is formed to service multiple client applications running on client nodes 102. In FIG. 15a, each client application has a separate queue 156.

One or more DFEs 116 may be assigned to the virtual resource 154 if required. Alternatively, no DFEs 116 may be assigned to the virtual resource 154 pending receipt of workloads from the client nodes 102 or for other reasons.

FIG. 15b illustrates an alternative configuration where a virtual resource 154, generally similar to that of FIG. 15a, is servicing multiple client applications running on multiple client nodes 102. However, in this configuration, the workloads from the multiple client applications are combined into a single aggregated queue 158.

Note that FIG. 15b shows each client application running on a client node 102 as having a corresponding queue 156. This client application queue 156 may in fact be located on the client node 102, or may be located on the server node 104. In alternative embodiments, it may be eliminated. However, in either case, in the configuration of FIG. 15b, the data workloads from multiple client applications are processed by the virtual resource 154 from the single aggregated queue 158.

As for the configuration of FIG. 15a, one or more DFEs 116 may be assigned to the virtual resource 154 if required. Alternatively, no DFEs 116 may be assigned to the virtual resource 154 pending receipt of workloads from the client nodes 102 or for other reasons.

The method of this embodiment will now be described with reference to FIG. 14.

Step 700: Request Resources

At step 700, multiple client applications running on one or more client nodes 102 require DFE 116 computational resources.

Upon initialization, the client applications running on the client node(s) 102 do not have awareness of the server node 104. Instead, the client applications are only aware of the resource controller 160. Each client application then sends a request from the client node 102 to the resource controller 160 to request the required resources.

In this instance, each of the client applications requesting resources are utilizing the same reference data (e.g. the same static data set). However, each client application may have different dynamic data.

The method proceeds to step 702.

Step 702: Initialize Resources

At step 702, the client applications running on a client node 102 provide the resource controller 160 with the necessary data to initialize the required DFEs 116 on the client application's behalf. This may comprise the necessary static data (comprising the static reference data $S_d$ and static program configuration data $S_p$ for each client application) which will, in use, be stored in the local memory 122 of any DFEs 116 assigned to the calculation and/or used to configure any DFEs 116 required to perform the appropriate computation.

Alternatively, instead of the resource controller 160 being provided with the necessary static initialization data, this data may be held by the client node 102 or the server node 104.

As a further alternative, the initialization data may comprise multiple portions held in different locations. For example, as set out above, the initialization data may comprise a reference data part and a program data part. The static program data part may be in the form of, in a non-limiting example, FPGA configuration data.

The program data parts may be held on the resource controller 160 or the server node 104, whereas the reference data part may be held on the client node 102.

The method proceeds to step 704.

Step 704: Identify Common Static Data

At step 704, the resource controller 160 identifies that the static data (comprising the static reference data $S_d$ and static program configuration data $S_p$) for more than one client application is the same (e.g. a human reference genome or reference genome for another animal). This may be done in a number of ways—for example, the program data may contain a specific flag or key identifying the program configuration.

Alternatively, the client applications may determine that the static data for more than one client application is the same, either by communicating with each other or through exploiting a priori knowledge (for example, they may all have been started by the same user), and can inform the resource controller 160 of this fact.

As a further alternative, the client applications may make an explicit request in step 700 to join a particular server node 104 and this may be identified in step 704.

Therefore, in this circumstance the resource controller 160 is operable to enable multiple client applications to share a single virtual resource 154 on a single server node 104.

The method proceeds to step 706.

Step 706: Select Resources

At step 706, the resource controller 160 selects appropriate unused DFEs 116 and communicates directly to the relevant server nodes 104 to initialize those DFEs 116 with the supplied initial static data in common between multiple client applications. Optionally, the server nodes 104 may also keep a copy of the initial static data.

As set out above, the actual process of initialization of the relevant DFEs 116 will depend upon where the initialization data is held. For example, if it is held on the resource controller 160, the resource controller 160 may send that data to the relevant DFEs 116 directly, or to the server nodes 104 on which those DFEs 116 reside.

Alternatively, if the server nodes 104 hold the initialization data, then these nodes 104 can initialize the relevant DFEs 116 internally.

In a further permutation, if all or part of the initialization data is held on one or more client nodes 102, then this data will need to be transferred to the relevant DFEs 116 or controlling server nodes 104. This may be done in response to a command from the resource controller 160 to the client node(s) 102, or this may be scheduled to occur automatically from the client node(s) 102 to the server nodes 104.

In a further alternative, if initialization data is stored on the client node(s) 102, then the transfer of initialization data may not occur at all in this step. Instead, appropriate DFEs 116 may be allocated in this step and the necessary initialization data sent when the resources are first used by the client application in step 716.

The method proceeds to step 708.

Step 708: Identify Resources

At step 708, the identity of the relevant server nodes 104 initialized in step 706 is passed to each client application running on the client node(s) 102 and sharing the common static data. This may be done by passing the network address of the relevant server nodes 104 to the relevant client node(s) 102.

The method proceeds to step 710.

Step 710: Establish Client-Server Connection

At step 710, the client node(s) 102 running the client applications can then connect directly to the relevant server node(s) 104 identified in step 708. The connections are made independently of the resource controller 160. In other words, in contrast to known load balancing arrangements, the resource controller 160 is not located in the data path between the client nodes 102 and the server node 104.

The method then proceeds to step 712.

Step 712: Present Virtualized Resource

The load-balancing of the system relies on the fact that the physical DFEs 116 are presented to the client node(s) 102 in the form of a single virtual resource 154 specific to the server node 104 but presented through a common inter-server virtualization layer 150.

The virtual resource 154 is then managed on the respective server node 104 managing the particular physical DFEs 116 which are allocated to the virtual resource 154. In other words, the virtual resource 154 is presented to the client applications running on the client node 102 as a single instance of the DFE 116 resource, or DFE resource topology. Internally within the server node 104 all the physical DFEs 116 allocated under the virtualized DFE resource 154 are utilized. Hence, the client applications will benefit from utilization of more resources. This provides an in-server automatic load balancing by automatically distributing the workload from the client applications across the physical DFE 116 resources under the allocated virtual resource 154.

It is further noted that, at particular times, a virtual resource 154 may be provided and be visible to the client application but have no physical DFEs 116 allocated thereto. This situation may occur where a workload for a virtual resource 154 is queued in a queue 156 and the virtual resource 154 is waiting for one or more physical DFEs 116 to become available.

The client application is unaware of the actual number of physical DFEs 116 (if any) that are allocated to a particular virtual resource 154. The client application merely sees a virtual resource 154 to which a workload is to be sent.

The method proceeds to step 714.

Step 714: Allocate Workload Queue

At step 714, workload queues are established for each of the client applications.

In the example of FIG. 15*a*, the virtual resource 154 establishes a FIFO workload queue 156 for each client application. In later steps, the client application is able to send a data processing workload (comprising the dynamic part of the input data of the data processing workload) to the FIFO queue 156 whereupon the data processing workload will be processed in later steps.

In the alternative example of FIG. 15*b*, a queue 156 is established either on the client node 102 or on the server 104 for each client application. This queue 156 is then fed into an aggregated queue 158 (together with other dynamic data from other client applications) for processing in later steps. Alternatively, clients may feed workloads directly to the aggregated queue 158.

The method proceeds to step 716.

Step 716: Utilize Resources

At step 716, the client applications can then access the requested DFEs 116 to perform workload calculations as required. Once steps 700-714 have been completed for all client applications sharing the same static data part, the client applications are able to use the virtualized DFEs 154 set up in the above process and will send workloads to the queues 156 of the virtual resource 154.

As part of this, the server node 104 hosting the virtual resource 154 will manage the dispatch of tasks from the queue(s) 156 or aggregated queue 158 to the appropriate physical DFE 116.

In use, the client applications send data processing workloads to the respective queues 156. Then, the virtual resource 154 will dispatch workload items to the DFEs 116 allocated thereto in accordance with one or more particular protocols.

The protocol used may vary as appropriate. For example, the virtual resource 154 may utilize a round robin approach where each non-zero length client application queue 156 is serviced in turn. Alternatively, the longest queue 156 may be serviced first. In a further alternative, client applications may be prioritized and the queue 156 of these applications served first.

Combinations of the above may be utilized. For example, a round robin may be implemented with a priority for particular client application queues 156 (e.g. dispatch two workload items for one client application as opposed to only one for another client application).

Considering the configuration shown in FIG. 15*b*, the aggregated queue 158 will be processed sequentially by the virtual resource 154. However, the order in which the aggregated queue 158 is arranged may be predefined in accordance with the above examples such that a pre-defined processing order is set out in the aggregated queue 158.

The method proceeds to step 718.

Step 718: Monitor Resources

Subsequent to step 716 above, when client applications are using the virtual resource 154, the resource controller 160 monitors the workload on each of the DFEs 116 and on the virtual resource 154. If the resource controller 160 detects underused or free resources in the system then the system moves to step 720 to perform load-balancing.

As described above, each server node 104 is able to manage local physical DFE 116 resources allocated to a virtual resource 154. In contrast, the resource controller 160 is also operable to monitor the workloads across all server nodes 104 as well as within the server nodes 104. The resource controller 160 can then reallocate or migrate DFE 116 resources as required to maintain optimum utilization and efficiency in the networked system as will be described below.

The method proceeds to step 720.

Step 720: Load Balance

At step 720, the resource controller 160 load balances the virtual resource 154 and the utilization of the DFEs 116 under control of the virtual resource 154. For example, this may mean that the physical DFE 116 resources associated with the virtual resource 154 are increased.

Load balancing can take place in the manner described in the above embodiments and examples, factoring in the constraints that each of the multiple client applications utilizing the virtual resource 154 must share the same static data part of their respective data processing workloads.

As set out above, the load balancing is carried out on two levels by the resource manager 160. First, the resource controller 160 can monitor the queue lengths Q (shown in FIGS. 15*a* and 15*b*) for the queue(s) 156 (FIG. 15*a*) or queue 158 (FIG. 15*b*) assigned to a particular virtual resource 154. If the queue length Q for one or more queues 156 (or the queue 158) is increasing, then the virtual resource 154 is under-utilized and the resource manager 160 may assign more resources thereto in the manner described in the above embodiments.

Secondly, the resource manager 160 is also operable to load balance between the DFEs 116 assigned to a particular virtual resource 154. This is done by monitoring the actual utilization of the DFE 120, 122 hardware of particular DFEs 116. This may comprise, for example, monitoring the number of clock cycles of the or each DFE 116 in a predetermined time period which were spent processing a data workload as opposed to being idle. Alternatively, other indirect measurements could be monitored, for example characteristics of the hardware such as temperature and power consumption.

Furthermore, once a virtual resource 154 has been established, additional clients can request to connect to that virtual resource 154. When a new client connects to the virtual resource 154, steps 700, 704, 710 and 714 are executed for that additional client application. In addition, client applications currently connected to the virtual resource 154 can disconnect, in which case any physical resources associated solely with servicing that client application (such as a client-specific workload queue 156) may be released.

The number of client applications utilizing a particular virtual resource 154 can therefore vary over time, while the virtual resource 154 itself remains in existence for at least as long as there are any clients utilizing it.

Variations of the above embodiments will be apparent to the skilled person. The precise configuration of hardware and software components may differ and still fall within the scope of the present invention claimed below. For example, whilst the exemplary embodiments have been described with reference to FPGA architecture, this need not be so. ASIC architecture or any other processor type may be used.

Alternatively, the types of physical processors utilizable are not limited to stream processors. Any type of physical processor may be used. As a further alternative, "physical processor" may include any number of processors, co-processors or stream processors which are collectively assignable as a group.

Alternatively, in certain embodiments, a virtual resource layer need not be provided and the client applications may access the server nodes 104 directly based on information provided by the resource controller.

Exemplary embodiments of this disclosure have been described. While such specific examples are shown in the drawings and are herein described in detail, it should be understood, however, that the drawings and detailed description are not intended to limit the scope of the claimed invention to the particular form disclosed by these embodiments. It will be appreciated that variations and modifications may be made to the examples described herein and still fall within the scope of the claimed invention.

What is claimed is:

1. A method of dynamically provisioning virtualised computational resources in a networked computer architecture comprising at least one client device operable to run one or more client applications, at least one server device and a resource controller, each server device comprising at least one physical processor implemented on a Field Programmable Gate Array or an Application Specific Integrated Circuit and having a local memory, and each server device providing a virtual resource layer through which one or more virtual processing resources can be defined and through which said one or more physical processors of said server device can be assigned to one or more of said virtual processing resources, wherein the method comprises:
    a) assigning, on a server device, one or more virtual processing resources to one or more client applications for processing of data processing workloads;
    b) monitoring, by said resource controller, the utilisation of the or each virtual processing resource and/or any physical processor assigned to said virtual processing resource; and
    c) dynamically adjusting, utilising said resource controller, which, and how many, physical processors are assigned to said virtual processing resource in response to the utilisation of said virtual processing resource or the utilisation of any physical processors assigned to said virtual processing resource.

2. The method according to claim 1, wherein said data processing workload includes input data comprising a static data part and a dynamic data part.

3. The method according to claim 2, wherein a copy of the static data part of said data processing workload is stored in the local memory of any physical processor assigned to said virtual processing resource.

4. The method according to claim 3, wherein said static data part further comprises program data, and wherein each physical processor assigned to said virtual processing resource is configured using said program data of said static data part.

5. The method according to claim 1, wherein said virtual processing resource comprises one or more workload queues, and wherein a workload queue is assigned to a client application accessing the virtual processing resource.

6. The method according to claim 5, wherein the monitoring of the utilization of said virtual processing resource comprises monitoring of the length of the or each workload queue assigned to a virtual processing resource.

7. The method according to claim 2, wherein step a) further comprises:
    d) storing, in said local memory of each physical processor assigned to said virtual processing resource, a copy of said static data part.

8. The method according to claim 2, wherein said static data part further comprises program data and step a) further comprises:
    e) configuring each physical processor assigned to said virtual processing resource using said program data of said static data part.

9. The method according to claim 2, wherein step c) comprises adding one or more further physical processors to said virtual processing resource by:
    f) identifying said further physical processors to add to said virtual processing resource;
    g) initializing, by said resource controller or said server device, the or each further physical processor by copying, to said local memory of each further physical processor, a copy of said static data part; and
    h) assigning said one or more further physical processors to said virtual processing resource.

10. The method according to claim 9, wherein said static data part further comprises program data and step g) further comprises:
    i) configuring each physical processor assigned to said virtual processing resource using said program data of said static data part.

11. The method according to claim 2, wherein step c) comprises adding one or more further physical processors to said virtual processing resource by:

j) identifying said further physical processors to add to said virtual processing resource;

k) initializing, utilizing said client device, the or each further physical processor by assigning said one or more further physical processors to said virtual processing resource; and l) copying, to said local memory of each further physical processor, a copy of said static data part.

12. The method according to claim 11, wherein said static data part further comprises program data and step k) further comprises:

m) configuring each further physical processor assigned to said virtual processing resource using said program data of said static data part.

13. The method according to claim 2, wherein step c) comprises migrating said virtual processing resource from said server to an alternative server by:

n) identifying alternative physical processors on an alternative server device to add to said virtual processing resource;

o) storing, in said local memory of each alternative physical processor, a copy of said static data part;

p) assigning said one or more alternative physical processors to a migrated virtual processing resource on said alternative server device; and q) redirecting said client application to said migrated virtual processing resource.

14. The method according to claim 13, wherein said static data part further comprises program data and step o) further comprises:

r) configuring each further physical processor assigned to said virtual processing resource using said program data of said static data part.

15. The method according to claim 13, wherein, subsequent to step q):

s) de-allocating the or each physical processor on the previously-utilized server.

16. The method according to claim 1, wherein, prior to step a), the method comprises:

t) receiving, at the resource controller, a request from a client application for data processing resources, said request specifying the configuration and/or amount of data processing resources required; and u) allocating, by the resource controller, one or more physical processors on a server device to said request.

17. The method according to claim 1, wherein the virtual resource layer comprises an inter-server resource layer and an intra-server resource layer, said one or more virtual processing resources being formed in said intra-server resource layer.

18. The method according to claim 17, wherein multiple virtual processing resources can be assigned to a single client application through said inter-server resource layer.

19. The method according to claim 1, wherein one or more of said physical processors comprises a stream processor or a collective group of stream processors.

20. A networked computational architecture for provisioning of virtualized computational resources, the networked computational architecture being accessible by one or more client applications run on one or more client devices and comprising:

a hardware layer comprising one or more server devices, each server device having at least one physical processor implemented on a Field Programmable Gate Array or an Application Specific integrated Circuit and having a local memory;

a virtual resource layer through which one or more virtual processing resources can be defined and through which said one or more physical processors of said server device can be assigned to one or more of said virtual processing resources, the or each virtual processing resource being accessible by the client applications for computational processing of a data processing workload; and a resource controller operable to monitor the utilization of the or each virtual processing resource and/or the or each physical processor assigned to said virtual processing resource and to adjust dynamically which, and how many, physical processors are assigned to the or each virtual processing resource.

21. The networked computational architecture according to claim 20, wherein said data processing workload includes input data comprising a static data part and a dynamic data part.

22. The networked computational architecture according to claim 21, wherein a copy of the static data part of said data processing workload is stored in the local memory of any physical processor assigned to a given virtual processing resource.

23. The networked computational architecture according to claim 21, wherein said static data part further comprises program data, and wherein any physical processor assigned to a given virtual processing resource is configured using said program data of said static data part.

24. The networked computational architecture according to claim 20, wherein the resource controller is further configured to add one or more further physical processors to a given virtual processing resource by: identifying said further physical processors to add to said virtual processing resource; initializing the or each further physical processor by copying, to said local memory of each further physical processor, a copy of said static data set; and assigning said one or more further physical processors to said virtual processing resource.

25. The networked computational architecture according to claim 24, wherein said static data part further comprises program data and the resource controller is further configured to configure each physical processor assigned to a given virtual processing resource using said program data of said static data part.

26. The networked computational architecture according to claim 20, wherein the resource controller is further configured to migrate a given virtual processing resource from said server to an alternative server by: identifying alternative physical processors on an alternative server device to add to said virtual processing resource; storing, in said local memory of each alternative physical processor, a copy of said static data set; assigning said one or more alternative physical processors to a migrated virtual processing resource on said alternative server device; and redirecting said client application to said migrated virtual processing resource.

27. The networked computational architecture according to claim 20, wherein one or more of said physical processors comprises a stream processor or a collective group of stream processors.

28. A non-transitory computer-readable medium having stored thereon a computer program executable by a programmable processing apparatus, comprising one or more software portions for performing the steps of claim 1.

29. A method of dynamically provisioning virtualized computational resources in a networked computer architecture comprising at least one client device operable to run one or more client applications, at least one server device and a resource controller, each server device comprising one or more physical processors having a local memory, and each server device providing a virtual resource layer through which one or more virtual processing resources can be defined and through which said one or more physical processors of said server device can be assigned to one or more of said virtual processing resources, wherein the method comprises:
- a) assigning, on a server device, one or more virtual processing resources to one or more client applications for processing of data processing workloads, said data processing work load including a static data part and a dynamic data part;
- b) monitoring, by said resource controller, the utilization of the or each virtual processing resource and/or any physical processor assigned to said virtual processing resource; and
- c) dynamically adjusting, utilizing said resource controller, which, and how many, physical processors are assigned to said virtual processing resource in response to the utilization of said virtual processing resource or the utilization of any physical processors assigned to said virtual processing resource by adding one or more further physical processors to said virtual processing resource by:
- d) identifying said further physical processors to add to said virtual processing resource;
- e) initializing, by said resource controller or said server device, the or each further physical processor by copying, to said local memory of each further physical processor, a copy of said static data part; and
- f) assigning said one or more further physical processors to said virtual processing resource.

\* \* \* \* \*